(12) United States Patent
Yasuda et al.

(10) Patent No.: US 9,794,194 B2
(45) Date of Patent: Oct. 17, 2017

(54) RELAY SYSTEM AND SWITCHING DEVICE

(71) Applicant: Hitachi Metals, Ltd., Minato-ku, Tokyo (JP)

(72) Inventors: Makoto Yasuda, Tsuchiura (JP); Shigeru Tsubota, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 225 days.

(21) Appl. No.: 14/679,739

(22) Filed: Apr. 6, 2015

(65) Prior Publication Data

US 2015/0288620 A1 Oct. 8, 2015

(30) Foreign Application Priority Data

Apr. 8, 2014 (JP) .................. 2014-079412

(51) Int. Cl.
*H04L 12/947* (2013.01)
*H04L 12/939* (2013.01)
*H04L 12/26* (2006.01)
*H04L 12/24* (2006.01)

(52) U.S. Cl.
CPC .......... *H04L 49/25* (2013.01); *H04L 43/0817* (2013.01); *H04L 49/552* (2013.01); *H04L 41/0663* (2013.01)

(58) Field of Classification Search
CPC ... H04L 49/25; H04L 49/552; H04L 41/0663; H04L 43/0817
USPC ........................................................ 370/401
See application file for complete search history.

(56) References Cited

U.S. PATENT DOCUMENTS 9,525,591 B2* 12/2016 Yasuda ............... H04L 41/0654
2011/0292931 A1 12/2011 Kizawa et al.
2015/0288559 A1* 10/2015 Yasuda ............... H04L 41/0654
370/217

FOREIGN PATENT DOCUMENTS

| JP | 2011-250185 A | 12/2011 |
| JP | 2012-209984 A | 10/2012 |
| JP | 2012-231223 A | 11/2012 |

OTHER PUBLICATIONS

ITU-T Y.1731, OAM functions and mechanisms for Ethernet based networks, Feb. 2008.*

* cited by examiner

*Primary Examiner* — Omar Ghowrwal
*Assistant Examiner* — Kokou R Detse
(74) *Attorney, Agent, or Firm* — Crowell & Moring LLP

(57) ABSTRACT

A MCLAG table retains a first port in association with a first identifier. A port control unit controls a first port group to a transmission/reception permitted state when the first port group is set to active, and controls the first port group to a transmission/reception prohibited state when the first port group is set to standby. A relay processing unit relays a frame containing the first identifier as a destination port to the first port group when the first port group is controlled to the transmission/reception permitted state and relays the same to a bridge port when the first port group is controlled to the transmission/reception prohibited state. When the first port group is controlled to the transmission/reception prohibited state, a transmission stop instructing unit instructs a peer device to stop frame transmission to the first port group.

14 Claims, 15 Drawing Sheets

FIG. 8A

FDB: ADDRESS TABLE

| MAC ADDRESS | VLANID | PORT ID/MCLAGID |
|---|---|---|
| MA1 | xxx | {MCLAG1} |
| MA2 | xxx | {MCLAG2} |
| ... | ... | ... |
| MAm | xxx | {P[m]} |
| ... | ... | ... |

FIG. 8B

27: FAULT MONITORING TABLE

| MONITORING SUBJECT | FAULT STATE |
|---|---|
| {MCLAG1}{SWm1} | FAULT |
| {P[1]}{SWm2} | NO FAULT |
| ... | ... |
| {Pb} | NO FAULT |
| ... | ... |

FIG. 8C

28: PORT CONTROL TABLE

| MCLAGID | CONTROL STATE |
|---|---|
| {MCLAG1} | FW |
| {MCLAG2} | BK |
| ... | ... |

RELAY SYSTEM AND SWITCHING DEVICE

CROSS-REFERENCE TO RELATED APPLICATION

The present application claims priority from Japanese Patent Application No. 2014-079412 filed on Apr. 8, 2014, the content of which is hereby incorporated by reference into this application.

TECHNICAL FIELD OF THE INVENTION

The present invention relates to a relay system and a switching device, for example, a relay system to which a device-level redundancy using two switching devices is applied.

BACKGROUND OF THE INVENTION

Japanese Patent Application Laid-Open Publication No. 2011-250185 (Patent Document 1) discloses a network system in which an inter-device link aggregation is set on each link between one network device and two network devices. When a fault occurs on a dedicated line connecting two network devices, an alternative path is established by using the link aggregation path. Also, two network devices are operated as an active system and a standby system for a control plane such as synchronization of path information between the devices, and are both used in an active state for a data plane.

Japanese Patent Application Laid-Open Publication No. 2012-209984 (Patent Document 2) discloses a configuration in which an inter-device link aggregation is set on each link between a customer edge in a user network and two provider edges in a MPLS network. When both of the two provider edges receive a packet from a different provider edge, only one of the two provider edges relays the packet to the customer edge based on a rule made in advance between the two provider edges.

Japanese Patent Application Laid-Open Publication No. 2012-231223 (Patent Document 3) discloses an access system in which a link is provided each between a user L2 switch and an active L2 switch and between the user L2 switch and a reserve L2 switch. In a normal situation, the reserve L2 switch controls a port serving as a connection source of the link to the user L2 switch to a link-down state. The user L2 switch transmits a broadcast frame such as an ARP to the active L2 switch and the reserve L2 switch, thereby automatically establishing a path bypassing the port controlled to the link-down state in the reserve L2 switch.

SUMMARY OF THE INVENTION

For example, an active/standby system typified by ESRP (Extreme Standby Router Protocol) and VSRP (Virtual Switch Redundancy Protocol) has been known as a device-level redundancy using layer 2 (hereinafter, abbreviated as "L2") switching devices which carry out the L2 processes. In such a system, when a fault occurs on a link between a user L2 switching device and an active L2 switching device, the user L2 switching device usually flushes a FDB (Forwarding DataBase) in order to switch the path to a link between the user L2 switching device and a standby L2 switching device. This may lead to communication congestion or the like due to flooding.

For the solution of such a problem, for example, the system using inter-device link aggregation group (hereinafter, abbreviated as "LAG") as described in the Patent Document 1 and the Patent Document 2 is considered. In this case, since the user L2 switching device virtually manages ports, on which the LAG is set, as a single port on the FDB, it is not necessary to perform the flushing of the FDB when a fault occurs.

Here, a configuration in which a user switching device [1] is connected to two L2 switching devices, to which an inter-device LAG is applied, via an inter-device LAG [1] and a user switching device [2] is connected thereto via an inter-device LAG [2], respectively is assumed. When a frame is transmitted from the switching device [1] to the switching device [2], the switching device [1] usually distributes frame transmission destinations to the two L2 switching devices based on a predetermined distribution rule. The two L2 switching devices which have received the frame transmit the frame to the switching device [2] in a properly distributed manner.

Meanwhile, a communication carrier, etc. desire to implement detailed network management including frame transfer paths in some cases. However, when the above-mentioned two L2 switching devices to which the inter-device LAG is applied are disposed in such a carrier network, network management may become complicated. Specifically, as described above, since frame transfer from the switching device [1] to the switching device [2] via the two L2 switching devices may take various paths due to the distributed transmission, it is not easy to sufficiently grasp the transfer paths. Such a problem becomes severer as the number of incorporated user switching devices increases like in a carrier network.

The present invention has been made in view of the problem above, and an object thereof is to provide a relay system and a switching device using a device-level redundancy and being capable of facilitating the network management.

The above and other objects and novel characteristics of the present invention will be apparent from the description of the present specification and the accompanying drawings.

The following is a brief description of an outline of the typical embodiment of the invention disclosed in the present application.

A relay system of the present embodiment includes: a first switching device; a second switching device; and a third switching device. Each of the first switching device and a second switching device has a first port group made up of one or a plurality of first ports, a second port and a bridge port, and the first switching device and the second switching device are connected to each other by a communication line via the bridge ports. The third switching device is connected to the one or the plurality of first ports of the first switching device and the one or the plurality of first ports of the second switching device via different communication lines, and the third switching device sets a link aggregation group on ports serving as connection sources of the communication lines. Here, each of the first switching device and the second switching device includes: a MCLAG table; a port control unit; a relay processing unit; and a transmission stop instructing unit. The MCLAG table retains the one or the plurality of first ports in association with a first identifier. The port control unit controls the first port group to a first state in which transmission and reception are both permitted when no fault is present and the first port group is set to active and controls the first port group to a second state in which transmission and reception are both prohibited when no fault is present and the first port group is set to standby. The relay processing unit relays a frame containing the first identifier as a destination port to the first port group when the first port group is controlled to the first state and relays a frame containing the first identifier as a destination port to the bridge port when the first port group is controlled to the second state. The transmission stop instructing unit instructs the third switching device to stop frame transmission to the first port group when the first port group is controlled to the second state. Then, the first port group of the first switching device is set to the active and the first port group of the second switching device is set to the standby.

The effects obtained by typical embodiments of the invention disclosed in the present application will be briefly described below. That is, in a relay system and a switching device using a device-level redundancy, the network management can be facilitated.

BRIEF DESCRIPTIONS OF THE DRAWINGS

FIG. 8A is a schematic diagram of a configuration example of an address table of FIG. 7;

FIG. 8B is a schematic diagram of a configuration example of a fault monitoring table of FIG. 7;

FIG. 8C is a schematic diagram of a configuration example of a port control table of FIG. 7;

DESCRIPTIONS OF THE PREFERRED EMBODIMENTS

Figure 1:
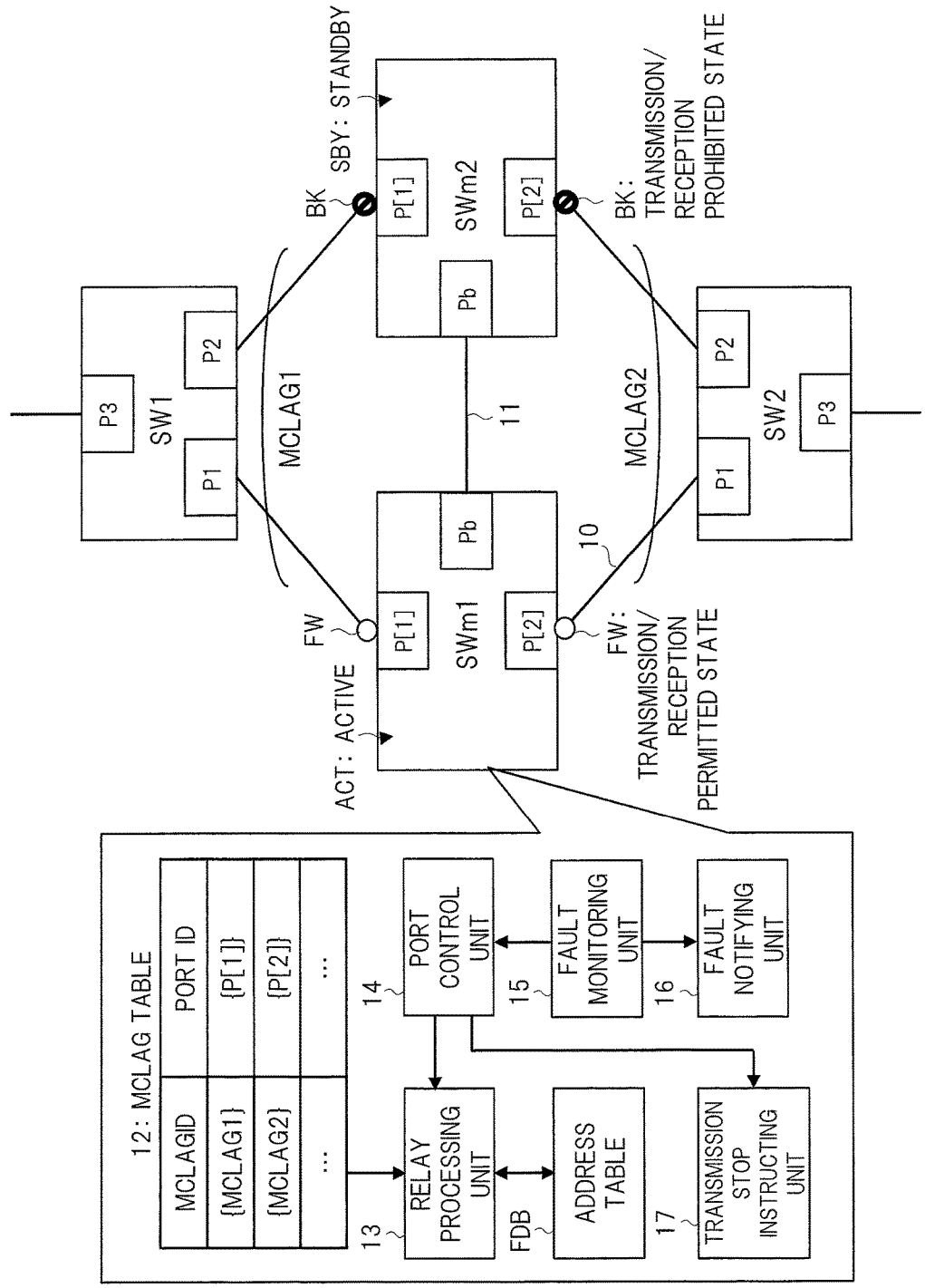
FIG. 1 is a schematic diagram of a configuration example of a relay system according to the first embodiment of the present invention.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof will be omitted.

First Embodiment

<<General Configuration of Relay System>>

FIG. 1 is a schematic diagram of a configuration example of a relay system according to the first embodiment of the present invention. The relay system of FIG. 1 includes two L2 switching devices (first and second switching devices) SWm1 and SWm2 to which an inter-device LAG is applied and a plurality of (here, two) user L2 switching devices SW1 and SW2.

Each of the L2 switching devices SWm1 and SWm2 has a MCLAG port group (first port group) P[1], a MCLAG port group (second port group) P[2], and a bridge port Pb. The MCLAG port group P[1] is made up of one or a plurality of MCLAG ports (first ports), and the MCLAG port group P[2] is made up of one or a plurality of MCLAG ports (second ports). In the first embodiment, each of the MCLAG port groups P[1] and P[2] is made up of one MCLAG port. Therefore, in the first embodiment, each of P[1] and P[2] represents both of the MCLAG port group and the MCLAG port.

The L2 switching device (first switching device) SWm1 and the L2 switching device (second switching device) SWm2 are connected through a communication line 11 via the bridge ports Pb. The communication line 11 is provided as, for example, a dedicated line or sometimes provided as an ordinary communication line (e.g., Ethernet (registered trademark) line).

The L2 switching device (third switching device) SW1 has a plurality of (here, two) LAG ports P1 and P2 and a port P3. The L2 switching device SW1 is connected to the one or the plurality of MCLAG ports (first ports) P[1] of the L2 switching device SWm1 and to the one or the plurality of MCLAG ports (first ports) P[1] of the L2 switching device SWm2 via different communication lines 10. In the example of FIG. 1, the LAG port P1 is connected to the MCLAG port P[1] of the L2 switching device SWm1, and the LAG port P2 is connected to the MCLAG port P[1] of the L2 switching device SWm2. Also, though not particularly limited, a terminal, etc. are connected to the port P3. The communication line 10 is provided as, for example, an Ethernet line.

In this case, the L2 switching device (third switching device) SW1 sets the LAG on the LAG ports P1 and P2 serving as connection sources of the communication lines 10 between the L2 switching device SW1 and the L2 switching devices SWm1 and SWm2. Note that the LAG is generally applied to a plurality of communication lines between one device and another device in many cases. In this example, however, the LAG is applied to a plurality of communication lines between one device and two devices. In this specification, therefore, such an inter-device LAG is distinguished from an ordinary LAG and is referred to as multi-chassis link aggregation group (hereinafter, abbreviated as "MCLAG"). The L2 switching device SW1 thus sets a MCLAG1 on the LAG ports P1 and P2. In this specification, the two L2 switching devices SWm1 and SWm2, to which such an inter-device LAG is applied, are collectively referred to as MCLAG device.

Similarly, the L2 switching device (fourth switching device) SW2 has a plurality of (here, two) LAG ports P1 and P2 and a port P3. The L2 switching device SW2 is connected to the one or the plurality of MCLAG ports (second ports) P[2] of the L2 switching device SWm1 and to the one or the plurality of MCLAG ports (second ports) P[2] of the L2 switching device SWm2 via different communication lines 10. In the example of FIG. 1, the LAG port P1 is connected to the MCLAG port P[2] of the L2 switching device SWm1, and the LAG port P2 is connected to the MCLAG port P[2] of the L2 switching device SWm2. Though not particularly limited, a terminal, etc. are connected to the port P3. The L2 switching device SW2 sets a MCLAG2 on the LAG ports P1 and P2 serving as connection sources of the communication lines 10 between the L2 switching device SW2 and the MCLAG devices.

In this example, two user L2 switching devices are provided. However, three or more user L2 switching devices or only one user L2 switching device may be provided in some cases. Specifically, the MCLAG devices may be connected to three or more user L2 switching devices via different MCLAGs or to only one user L2 switching device via a MCLAG in some cases. In this example, each MCLAG device has the bridge port Pb and the MCLAG ports P[1] and P[2]. However, the MCLAG device may also have a normal port on which no MCLAG is set. For example, the L2 switching devices SWm1 and SWm2 may have the configuration in which the MCLAG ports P[2] are not MCLAG ports but are normal ports and different terminals, etc., are connected to the normal ports P[2], respectively.

Each of the L2 switching devices (first and second switching devices) SWm1 and SWm2 has a MCLAG table 12, a relay processing unit 13, an address table FDB, a port control unit 14, a fault monitoring unit 15, a fault notifying unit 16, and a transmission stop instructing unit 17. The MCLAG table 12 retains one or a plurality of MCLAG ports (actually, port identifiers thereof) of its own switching device in association with MCLAG identifiers.

In the example of FIG. 1, the MCLAG table 12 retains the MCLAG port (first port) P[1] ({P[1]}) in association with a MCLAG identifier (first identifier) {MCLAG1} and retains the MCLAG port (second port) P[2] ({P[2]}) in association with a MCLAG identifier (second identifier) {MCLAG2}. In this specification, for example, {AA} represents an identifier (ID) for "AA". For example, it is determined in advance that MCLAG devices commonly use each of the MCLAG identifiers {MCLAG1} and {MCLAG2}. Each L2 switching device constituting the MCLAG device determines its own MCLAG port (P[1]) (actually, port identifier ({P[1]}) thereof) to be assigned to a MCLAG identifier (e.g., {MCLAG1}) based on its own MCLAG table 12.

When no fault is present and MCLAG port groups P[1] and P[2] are set to active ACT, the port control unit 14 controls the MCLAG port groups to a transmission/reception permitted state (first state) FW in which transmission and reception are both permitted. Meanwhile, when no fault is present and the MCLAG port groups P[1] and P[2] are set to standby SBY, the port control unit 14 controls the MCLAG port groups to a transmission/reception prohibited state (second state) BK in which transmission and reception are both prohibited. The transmission/reception permitted state FW and the transmission/reception prohibited state BK are applied to an ordinary frames such as a user frame, and are not applied to a control frame (described later) for managing and controlling the device.

In the first embodiment, one of the two L2 switching devices SWm1 and SWm2 constituting the MCLAG devices (SWm1 in this example) is set to active ACT in units of device in advance, and the other (SWm2 in this example) is set to standby SBY in units of device in advance. The L2 switching device SWm1 set to active ACT sets all of its own MCLAG port groups P[1] and P[2] to active ACT, and the L2 switching device SWm2 set to standby SBY sets all of its own MCLAG port groups P[1] and P[2] to standby SBY.

When no fault is present, the port control unit 14 of the L2 switching device SWm1 controls its own MCLAG port groups P[1] and P[2] to the transmission/reception permitted state (first state) FW because its own MCLAG port groups P[1] and P[2] are both set to active ACT. Meanwhile, the port control unit 14 of the L2 switching device SWm2 controls its own MCLAG port groups P[1] and P[2] to the transmission/reception prohibited state (second state) BK because its own MCLAG port groups P[1] and P[2] are both set to standby SBY.

When the MCLAG port groups P[1] and P[2] of its own switching device are controlled to the transmission/reception permitted state (first state) FW, the relay processing unit 13 relays a frame containing a MCLAG identifier {MCLAG1} or {MCLAG2} as a destination port to its own MCLAG port group corresponding to the MCLAG identifier. For example, when the MCLAG port group (first port group) P[1] of its own switching device is controlled to the transmission/reception permitted state FW (that is, in the case of the L2 switching device SWm1), the relay processing unit 13 relays a frame containing the MCLAG identifier (first identifier) {MCLAG1} as a destination port to its own MCLAG port group (MCLAG port) P[1].

Meanwhile, when the MCLAG port groups P[1] and P[2] of its own switching device are controlled to the transmission/reception prohibited state (second state) BK, the relay processing unit 13 relays a frame containing a MCLAG identifier {MCLAG1} or {MCLAG2} as a destination port to the bridge port Pb. For example, when the MCLAG port group (first port group) P[1] of its own switching device is controlled to the transmission/reception prohibited state BK, the relay processing unit 13 relays a frame containing the MCLAG identifier (first identifier) {MCLAG1} as a destination port to the bridge port Pb. In the example of FIG. 1, the operation via the bridge port Pb like this is not assumed. However, if the MCLAG port P[2] is not a MCLAG port but a normal port or a fault occurs as described later, the operation like this may arise.

Here, the frame destination port is determined based on the retrieval result on the address table FDB. It is widely known that the address table FDB retains the correspondence relation between a port and a MAC (Media Access Control) address present ahead of the port. The relay processing unit 13 carries out, for example, the following process for the address table FDB.

When a port having received a frame is a MCLAG port group P[1] or P[2] of its own switching device, the relay processing unit 13 determines the MCLAG identifier corresponding to the MCLAG port group to be a reception port identifier. The relay processing unit 13 then learns a source MAC address contained in the frame in association with the reception port identifier to the address table FDB. For example, when a frame is received at the MCLAG port group (first port group) P[1], the relay processing unit 13 determines the MCLAG identifier {MCLAG1} corresponding thereto to be a reception port identifier, and then learns a source MAC address contained in the frame in association with the MCLAG identifier {MCLAG1} to the address table FDB.

Also, the relay processing unit 13 retrieves a destination port corresponding to the destination MAC address contained in the frame from the address table FDB. Based on the retrieval result, when the destination port corresponding to the destination MAC address is a MCLAG identifier and the MCLAG port group of its own switching device corresponding to the MCLAG identifier is controlled to the transmission/reception prohibited state BK, the relay processing unit 13 relays a frame, to which a reception port identifier is added, to the bridge port Pb. Furthermore, when a frame to which the reception port identifier is added is received at the bridge port Pb, the relay processing unit 13 learns the source MAC address contained in the frame in association with the reception port identifier added to the frame to the address table FDB.

The fault monitoring unit 15 detects fault occurrence and recovery from fault at each of ports of its own switching device (MCLAG port groups P[1] and P[2] and bridge port Pb). Specifically, the fault monitoring unit 15 detects the fault occurrence by recognizing, for example, reduction of signal intensity of a received signal, non-detection of a pulse signal such as FLP (Fast Link Pulse), or non-reception of an existence-confirming frame transmitted and received at regular intervals. When the fault monitoring unit 15 detects the fault occurrence at a MCLAG port group, the fault notifying unit 16 transmits a fault notification frame through the bridge port Pb. Also, when the fault monitoring unit 15 detects the recovery from fault at a MCLAG port group, the fault notifying unit 16 transmits a fault recovery frame through the bridge port Pb.

When a MCLAG port group of its own switching device is controlled to the transmission/reception prohibited state BK, the transmission stop instructing unit 17 instructs the L2 switching device connected to the MCLAG port group to stop transmission of a frame (specifically, user frame) to the MCLAG port group. For example, the transmission stop instructing unit 17 of the L2 switching device SWm2 instructs the L2 switching device (third switching device) SW1 to stop transmission of a frame to the MCLAG port group (first port group) P[1].

As one specific example of a method of stopping frame transmission, the transmission stop instructing unit 17 puts a MCLAG port group (MCLAG port), which is controlled to the transmission/reception prohibited state BK, into a link-down state by actually cutting off the output of optical signals. For example, when the MCLAG port P[1] of the L2 switching device SWm2 is put into the link-down state, the L2 switching device SW1 detects the link-down state by using an ordinary function which the L2 switching device usually has, and controls the LAG port P2 to a transmission/reception disabled state, etc. When transmitting a frame to the MCLAG1, the L2 switching device SW1 determines member ports of the MCLAG1 (LAG ports P1 and P2) to be candidates for the transmission port and selects one port out of the candidates. At this time, the LAG port P2 which is controlled to the transmission/reception disabled state is eliminated from the candidates for the transmission ports in the MCLAG1.

As another specific example of the method of stopping frame transmission, the transmission stop instructing unit 17 generates a control frame for pretending that a fault occurs at a MCLAG port group controlled to the transmission/reception prohibited state BK, and transmits the control frame from the MCLAG port group. For example, the transmission stop instructing unit 17 of the L2 switching device SWm2 transmits such a control frame from the MCLAG port group (MCLAG port) P[1]. The L2 switching device SW1 having received the control frame controls the LAG port P2 to the transmission/reception disabled state, etc.

In view of the general-purpose properties of the L2 switching device SW1, a frame based on Ethernet OAM (Operations, Administration and Maintenance) is preferably used as the control frame. Ethernet OAM has been standardized by "ITU-T Y.1731" and "IEEE802.1ag", etc. as maintenance/administrative functions. Ethernet OAM specifies CC (Continuity Check) function as one of its functions. This is the function of transmitting and receiving a control frame called CCM (Continuity Check Message) (hereinafter, referred to as CCM control frame) between different monitoring points called MEP (Maintenance End Point) to monitor continuity between the monitoring points.

For example, the L2 switching device SWm2 and the L2 switching device SW1 configure the MCLAG port P[1] of the L2 switching device SWm2 and the LAG port P2 of the L2 switching device SW1 as MEPs, respectively, and transmit and receive CCM control frames between the MEPs at regular intervals. For example, when the L2 switching device SWm2 cannot receive a CCM control frame from the L2 switching device SW1 for a predetermined period, the L2 switching device SWm2 recognizes the continuity with respect to the L2 switching device SW1 (more exactly, continuity between the MEPs) as a LOC (Loss of Continuity) state. In this case, the L2 switching device SWm2 transmits the CCM control frame having a flag attached to a RDI (Remote Defect Indication) bit when transmitting the CCM control frame from the MCLAG port P[1] to the LAG port P2 of the L2 switching device SW1.

In this specification, a CCM control frame having no flag attached to a RDI bit is simply referred to as a CCM frame (abbreviated as CCM) and a CCM control frame having a flag attached to a RDI bit is referred to as a RDI frame (abbreviated as RDI). Upon receiving the RDI, the L2 switching device SW1 recognizes that the transmission path from the LAG port P2 has a fault, and stops transmitting a frame (user frame) from the LAG port P2 until transmission of the RDI is canceled (that is, until becoming able to receive the CCM).

By utilizing the mechanism of Ethernet OAM described above, for example, the transmission stop instructing unit 17 of the L2 switching device SWm2 transmits the RDI from the MCLAG port P[1] despite the fact that the CCM control frame is received at the MCLAG port P[1]. By this means, the transmission stop instructing unit 17 of the L2 switching device SWm2 instructs the L2 switching device SWm1 to stop the frame transmission to the MCLAG port P[1].

When comparing the method using the link-down state and the method using the control frame, in the method using the link-down state, it takes time to put a port in a link-up state (i.e., changing the state from the transmission/reception prohibited state BK to the transmission/reception permitted state FW) in accordance with a fault as described later. Therefore, from this viewpoint, the method using the control frame is more desirable. Hereinafter, in the present embodiment, both of the MCLAG devices (SWm1 and SWm2) and the user L2 switching devices SW1 and SW2 are assumed to have the Ethernet OAM functions. Thus, in the following description, the case in which the control frame based on Ethernet OAM is used as the method of stopping the frame transmission is taken as an example.

<<General Operation of Relay System (in the Absence of Fault)>>

Figure 2:
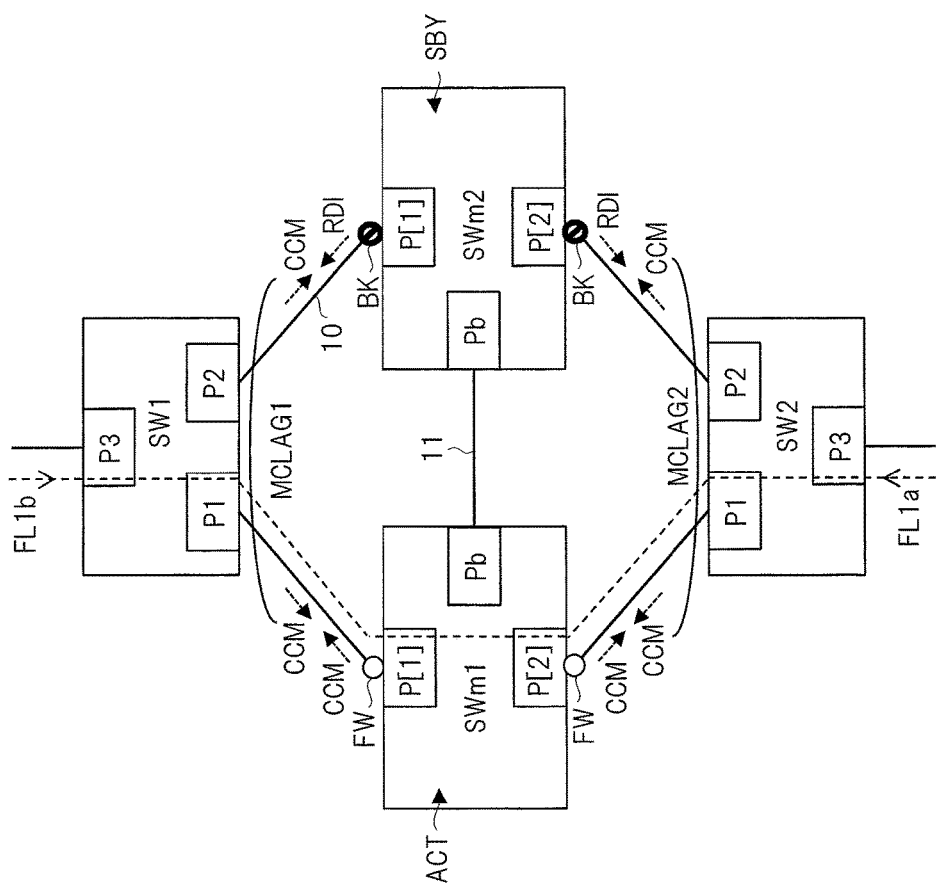
FIG. 2 is an explanatory diagram schematically showing an operation example in the absence of fault in the relay system of FIG. 1.

FIG. 2 is an explanatory diagram schematically showing an operation example in the absence of fault in the relay system of FIG. 1. In this example, a frame is transmitted and received between a terminal connected to the port P3 of the user L2 switching device SW1 and a terminal connected to the port P3 of the user L2 switching device SW2. As shown in FIG. 2, the L2 switching device SWm1 transmits CCM at regular intervals from the MCLAG port groups (MCLAG ports) P[1] and P[2] in the transmission/reception permitted state FW. Each of the user L2 switching devices SW1 and SW2 receives the CCM at regular intervals at the LAG port P1, and therefore transmits the CCM at regular intervals from the LAG port P1.

Meanwhile, the L2 switching device SWm2 transmits RDI from the MCLAG port groups (MCLAG ports) P[1] and P[2] in the transmission/reception prohibited state BK. Each of the user L2 switching devices SW1 and SW2 receives the RDI at the LAG port P2, and therefore transmits CCM from the LAG port P2. As a result, the L2 switching device SWm2 receives CCM at the MCLAG port groups P[1] and P[2].

Here, although the L2 switching device SWm2 receives CCM at the MCLAG ports P[1] and P[2], it transmits RDI at regular intervals from the MCLAG ports P[1] and P[2]. Each of the L2 switching devices SW1 and SW2 having received the RDI transmits CCM at regular intervals from the LAG port P2. Hence, each of the user L2 switching devices SW1 and SW2 controls the LAG port P2 to the transmission/reception disabled state, etc.

In this situation, the case where the user L2 switching device SW2 relays a frame FL1a received at the port P3 to the LAG port P1 as shown in FIG. 2 is assumed. In this case, since the LAG port P2 is eliminated from candidates for transmission port in the MCLAG2, the L2 switching device SW2 relays the frame FL1a to the LAG port P1. The L2 switching device SWm1 receives the frame FL1a at the MCLAG port group (MCLAG port) P[2], and learns a source MAC address of the frame FL1a in association with a reception port identifier ({MCLAG2}) to the address table FDB as described with reference to FIG. 1.

Also, the L2 switching device SWm1 retrieves a destination port corresponding to a destination MAC address of the frame FL1a from the address table FDB. As the retrieval result of the destination port, the L2 switching device SWm1 acquires the MCLAG identifier {MCLAG1}. Since its own MCLAG port group P[1] corresponding to the MCLAG identifier {MCLAG1} is controlled to the transmission/reception permitted state FW, the L2 switching device SWm1 relays the frame FL1a to the MCLAG port group (MCLAG port) P[1]. The user L2 switching device SW1 receives the frame FL1a at the LAG port P1 and relays the frame FL1a to the port P3.

Then, the case in which the user L2 switching device SW1 relays a frame FL1b received at the port P3 to the LAG port P1 to be the candidate for transmission port in the MCLAG1 in reverse is assumed. Also in this case, the L2 switching device SWm1 performs the learning of a source MAC address of the frame FL1b and the retrieval of a destination port in the same manner. As the retrieval result of the destination port, the L2 switching device SWm1 acquires the MCLAG identifier {MCLAG2}. Since its own MCLAG port group P[2] corresponding to the MCLAG identifier {MCLAG2} is controlled to the transmission/reception permitted state FW, the L2 switching device SWm1 relays the frame FL1b to the MCLAG port group (MCLAG port) P[2], and the user L2 switching device SW2 relays the frame FL1b to the port P3.

As described above, when no fault is present, for example, the frame FL1a containing the MCLAG identifier (first identifier) {MCLAG1} as the destination and received at the MCLAG port (second port) P[2] of the L2 switching device (first switching device) SWm1 is relayed to the MCLAG port group (first port group) P[1] of the L2 switching device SWm1. Specifically, the frame is always transmitted from the MCLAG port group set to active ACT in the MCLAG device (in this case, P[1] of SWm1) to the L2 switching device SW1 and is not transmitted from the MCLAG port group set to standby SBY (in this case, P[1] of SWm2). Also, the same is true when the direction is reversed, and the frame is always transmitted from the MCLAG port group set to active ACT (P[2] of SWm1) to the L2 switching device SW2 and is not transmitted from the MCLAG port group set to standby SBY (P[2] of SWm2).

As a result, a frame transfer path is grasped easily and therefore the network management can be facilitated. Specifically, when a frame is monitored by, for example, port mirroring in the MCLAG device, it is only required to monitor the MCLAG port groups set to active ACT (P[1] and P[2] of SWm1) and the MCLAG port groups set to standby SBY can be eliminated from monitoring subjects. Also, as described above, when active ACT or standby SBY is set in units of device, it is only required to monitor the devices set to active ACT. Such a reduction in monitoring subjects is particularly advantageous when the number of user L2 switching devices to be incorporated is large like in a carrier network, etc.

Here, the setting method to active ACT or standby SBY is not necessarily a setting method in units of device, but may be a setting method in units of MCLAG port group. In this case, for example, in FIG. 2, it is also possible to set the MCLAG port group P[2] of the L2 switching device SWm1 to standby SBY unlike the MCLAG port group P[1] and set the MCLAG port group P[2] of the L2 switching device SWm2 to active ACT unlike the MCLAG port group P[1], respectively. Also in this case, only the MCLAG port groups set to active ACT can be taken as the monitoring subjects.

In this case, however, a transfer path in the case of no fault passes through the bridge port Pb, and this may lead to a problem that latency and processing loads increase due to the frame relaying. For this reason, even in the case where active ACT or standby SBY is set in units of MCLAG port group, it is desirable to match the setting of active ACT or standby SBY in units of device in the same manner as the case of FIG. 2.

According to the technique of the Patent Document 1, both are operated in an active state for the data plane, and there is no distinction between active and standby for the MCLAG port groups like in the first embodiment. Also, the technique of the Patent Document 2 is the technique of controlling a transfer path by defining an action with respect to the combination of a source address and a destination address based on the MPLS network, and this is essentially different from the method of the first embodiment. Furthermore, the technique of the Patent Document 3 does not use the LAG, and in this case, flushing of the FDB may be required when a fault occurs as described above.

<<General Operation of Relay System (in the Occurrence of Fault at MCLAG Port Group)>>

Figure 3:
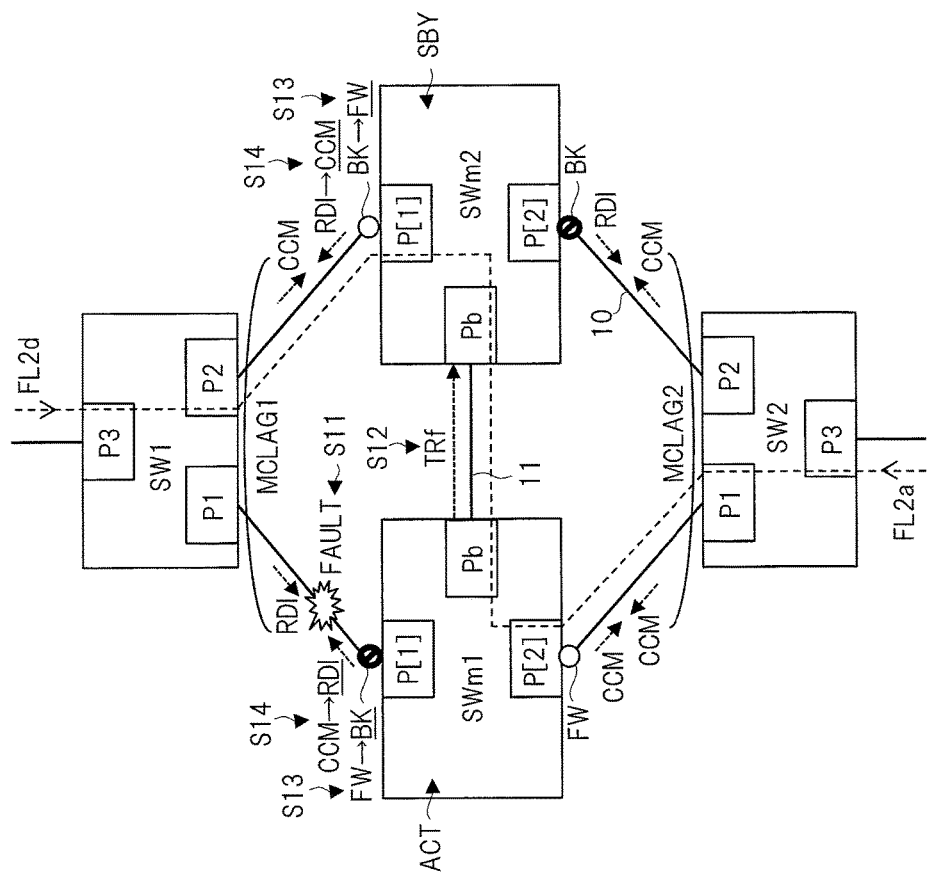
FIG. 3 is an explanatory diagram schematically showing an operation example in the occurrence of fault at a MCLAG port group in the relay system of FIG. 1.

FIG. 3 is an explanatory diagram schematically showing an operation example in the occurrence of fault at a MCLAG port group in the relay system of FIG. 1. Here, the case where a fault occurs on the communication line 10 connected to the MCLAG port group (MCLAG port) P[1] of the L2 switching device SWm1 in the state of the absence of fault shown in FIG. 2 is taken as an example. First, the fault monitoring unit 15 of the L2 switching device SWm1 detects a fault occurrence at the MCLAG port P[1] (step S11). In response to the detection of the fault occurrence, the fault notifying unit 16 of the L2 switching device SWm1 transmits a fault notification frame TRf containing information of the place of the fault occurrence to the bridge port Pb (step S12).

Here, when occurrence of a fault at a MCLAG port group is detected by the fault monitoring unit 15, the port control unit 14 of FIG. 1 controls the MCLAG port group to the transmission/reception prohibited state (second state) BK. Also, when the occurrence of fault at the MCLAG port group is not detected by the fault monitoring unit 15 and the fault notification frame TRf is received via the bridge port Pb, the port control unit 14 controls its own MCLAG port group constituting a MCLAG together with the place of fault occurrence contained in the fault notification frame TRf to the transmission/reception permitted state (first state) FW.

In the example of FIG. 3, since the fault monitoring unit 15 has detected the fault occurrence at the MCLAG port group (first port group) P[1], the port control unit 14 of the L2 switching device SWm1 controls the MCLAG port group P[1] to the transmission/reception prohibited state BK from the transmission/reception permitted state FW (step S13). Since the MCLAG port group P[1] is controlled to the transmission/reception prohibited state BK, the transmission stop instructing unit 17 of the L2 switching device SWm1 transmits RDI in place of CCM from the MCLAG port group (MCLAG port) P[1] (step S14). Since the user L2 switching device SW1 cannot receive the RDI from the L2 switching device SWm1 due to the fault, the user L2 switching device SW1 transmits RDI from the LAG port P1.

Meanwhile, since the fault monitoring unit 15 detects no fault occurrence at the MCLAG port groups and the fault notification frame TRf is received, the port control unit 14 of the L2 switching device SWm2 controls its own MCLAG port group P[1] constituting the MCLAG1 together with the place of fault occurrence (P[1] of SWm1) to the transmission/reception permitted state FW from the transmission/reception prohibited state BK (step S13). Since the MCLAG port group P[1] is controlled to the transmission/reception permitted state FW, the L2 switching device SWm2 transmits CCM in place of RDI from the MCLAG port group P[1] (step S14). Since the user L2 switching device SW1 receives the CCM from the L2 switching device SWm2 at the LAG port P2, the user L2 switching device SW1 transmits CCM from the LAG port P2.

Consequently, the user L2 switching device SW1 controls the LAG port P1 to the transmission/reception disabled state, etc. and controls the LAG port P2 to the transmission/reception enabled state, etc. The LAG port P2 controlled to the transmission/reception enabled state is added to the candidates for transmission port in the MCLAG1, and the LAG port P1 controlled to the transmission/reception disabled state is eliminated from the candidates for transmission port in the MCLAG1. The MCLAG port groups P[2] of the L2 switching devices SWm1 and SWm2 are the same as those in the case of FIG. 2. Hence, the user L2 switching device SW2 eliminates the LAG port P2 from the candidates for transmission port in the MCLAG2 in the same manner as the case of FIG. 2.

In this situation, first, the case in which the user L2 switching device SW2 relays a frame FL2a received at the port P3 to the LAG port P1 which is a candidate for transmission port in the MCLAG2 is assumed. In this case, the L2 switching device SWm1 receives the frame FL2a at the MCLAG port group (MCLAG port) P[2] and learns a source MAC address thereof in association with a reception port identifier ({MCLAG2}) to the address table FDB.

Also, the L2 switching device SWm1 retrieves a destination port corresponding to a destination MAC address of the frame FL2a from the address table FDB. As the retrieval result of the destination port, the L2 switching device SWm1 acquires the MCLAG identifier {MCLAG1}. Since its own MCLAG port group P[1] corresponding to the MCLAG identifier {MCLAG1} is controlled to the transmission/reception prohibited state BK, the L2 switching device SWm1 relays the frame FL2a to the bridge port Pb. At this time, the L2 switching device SWm1 adds a reception port identifier ({MCLAG2}) to the frame FL2a.

The L2 switching device SWm2 receives the frame FL2a, to which the reception port identifier ({MCLAG2}) is added, at the bridge port Pb, and learns the source MAC address thereof in association with the reception port identifier ({MCLAG2}) to the address table FDB. Also, the L2 switching device SWm2 retrieves the destination port corresponding to the destination MAC address of the frame FL2a from the address table FDB, and acquires the MCLAG identifier {MCLAG1} as the retrieval result thereof. Since its own MCLAG port group P[1] corresponding to the MCLAG identifier {MCLAG1} is controlled to the transmission/reception permitted state FW, the L2 switching device SWm2 relays the frame FL2a to the MCLAG port group (MCLAG port) P[1]. The user L2 switching device SW1 receives the frame FL2a at the LAG port P2 and relays the frame FL2a to the port P3.

Next, the case in which the user L2 switching device SW1 relays a frame FL2d received at the port P3 to the LAG port P2 which is a candidate for transmission port in the MCLAG1 is assumed. In this case, the L2 switching device SWm2 receives the frame FL2d at the MCLAG port group (MCLAG port) P[1] and learns a source MAC address thereof in association with a reception port identifier ({MCLAG1}) to the address table FDB.

Also, the L2 switching device SWm2 retrieves a destination port corresponding to a destination MAC address of the frame FL2d from the address table FDB, and the L2 switching device SWm2 acquires the MCLAG identifier {MCLAG2} as the retrieval result of the destination port. Since its own MCLAG port group P[2] corresponding to the MCLAG identifier {MCLAG2} is controlled to the transmission/reception prohibited state BK, the L2 switching device SWm2 relays the frame FL2d to the bridge port Pb. At this time, the L2 switching device SWm2 adds a reception port identifier ({MCLAG1}) to the frame FL2d.

The L2 switching device SWm1 receives the frame FL2d, to which the reception port identifier ({MCLAG1}) is added, at the bridge port Pb, and learns the source MAC address thereof in association with the reception port identifier ({MCLAG1}) to the address table FDB. Also, the L2 switching device SWm1 retrieves the destination port corresponding to the destination MAC address of the frame FL2d from the address table FDB, and acquires the MCLAG identifier {MCLAG2} as the retrieval result thereof. Since its own MCLAG port group P[2] corresponding to the MCLAG identifier {MCLAG2} is controlled to the transmission/reception permitted state FW, the L2 switching device SWm1 relays the frame FL2d to the MCLAG port group (MCLAG port) P[2]. The user L2 switching device SW2 receives the frame FL2d at the LAG port P1 and relays the frame FL2d to the port P3.

In the case of FIG. 3, for example, both MCLAG devices (SWm1 and SWm2) perform the retrieval on the address table FDB with respect to the frames FL2a and FL2d. In some cases, however, only one of the MCLAG devices may perform the retrieval on the address table FDB. Specifically, for example, the L2 switching device SWm1 having received the frame FL2a performs the retrieval on the address table FDB and relays the frame FL2a, to which the reception port identifier as well as the destination port identifier {MCLAG1} is added, to the bridge port Pb. Upon reception of the frame FL2a, the L2 switching device SWm2 relays the frame FL2a based on the destination port identifier {MCLAG1}.

<<General Operation of Relay System (in the Recovery from Fault at MCLAG Port Group>>

Figure 4:
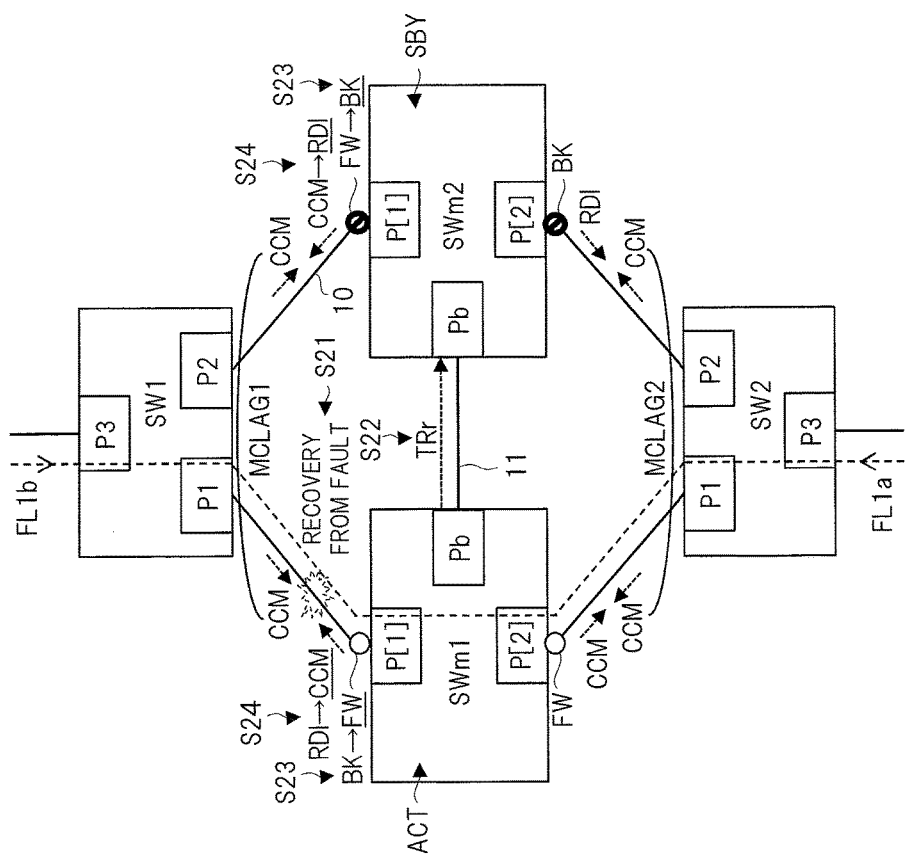
FIG. 4 is an explanatory diagram schematically showing an operation example in the case of recovery from fault at a MCLAG port group in the relay system of FIG. 1.

FIG. 4 is an explanatory diagram schematically showing an operation example in the case of recovery from fault at a MCLAG port group in the relay system of FIG. 1. Here, the case where the fault at the MCLAG port group shown in FIG. 3 is recovered is taken as an example. In FIG. 4, first, the fault monitoring unit 15 of the L2 switching device SWm1 detects the recovery from fault at the MCLAG port group (MCLAG port) P[1] (step S21). In response to the detection of the recovery from the fault, the fault notifying unit 16 of the L2 switching device SWm1 transmits a fault recovery frame TRr containing information of the place of recovery from fault to the bridge port Pb (step S22).

Here, when a MCLAG port group is set to active ACT and the fault monitoring unit 15 detects the recovery from fault at the MCLAG port group, the port control unit 14 of FIG. 1 controls the MCLAG port group to the transmission/reception permitted state (first state) FW. Meanwhile, when a MCLAG port group is set to standby SBY and a fault recovery frame is received via the bridge port Pb, the port control unit 14 controls its own MCLAG port group constituting a MCLAG together with a place of recovery from fault contained in the fault recovery frame to the transmission/reception prohibited state (second state) BK.

In the example of FIG. 4, since the fault monitoring unit 15 has detected the recovery from fault at the MCLAG port group (first port group) P[1], the port control unit 14 of the L2 switching device SWm1 controls the MCLAG port group P[1] to the transmission/reception permitted state FW from the transmission/reception prohibited state BK (step S23). Since the MCLAG port group P[1] is controlled to the transmission/reception permitted state FW, the L2 switching device SWm1 transmits CCM in place of RDI from the MCLAG port group (MCLAG port) P[1] (step S24). Since the L2 switching device SW1 receives the CCM from the L2 switching device SWm1 at the LAG port P1, the L2 switching device SW1 transmits CCM from the LAG port P1.

Meanwhile, since the fault recovery frame TRr is received, the port control unit 14 of the L2 switching device SWm2 controls its own MCLAG port group P[1] constituting the MCLAG1 together with the place of recovery from fault (P[1] of SWm1) to the transmission/reception prohibited state BK from the transmission/reception permitted state FW (step S23). Since the MCLAG port group P[1] is controlled to the transmission/reception prohibited state BK, the transmission stop instructing unit 17 of the L2 switching device SWm2 transmits RDI in place of CCM from the MCLAG port P[1] (step S24).

Since the user L2 switching device SW1 receives the RDI from the L2 switching device SWm2 at the LAG port P2, the user L2 switching device SW1 transmits CCM from the LAG port P2. Since the L2 switching device SW1 receives the CCM at the LAG port P1 and receives the RDI at the LAG port P2, the L2 switching device SW1 controls the LAG port P1 to the transmission/reception enabled state, etc., and controls the LAG port P2 to the transmission/reception disabled state, etc. In other words, the LAG port P1 is added to the candidates for transmission port in the MCLAG1, and the LAG port P2 is eliminated from the candidates for transmission port in the MCLAG1.

Consequently, the same state as indicated in FIG. 2 is achieved. As a result, as shown in FIG. 4, the transfer paths of the frames FL1a and FL1b are determined to be the same transfer paths as indicated in FIG. 2. Note that, in FIG. 3 described above, the L2 switching device SWm1 learns the source MAC address of the frame FL2d in association with the MCLAG identifier {MCLAG1} to the address table FDB. As a result, the L2 switching device SWm1 can retrieve the destination correctly from the address table FDB even in the case of the recovery from fault like the case of FIG. 4. Specifically, when the L2 switching device SWm1 has recovered from fault like the case of FIG. 4 and receives a frame containing the source MAC address of the frame FL2d as a destination MAC address, the L2 switching device SWm1 can acquire the MCLAG identifier {MCLAG1} as a destination port thereof.

Although an operation example of automatically returning back to the state of FIG. 2 in response to the recovery from fault has been described here, the operation is not limited to this and whether or not the state is returned back to that of FIG. 2 may be determined selectively. Specifically, for example, the MCLAG device has an automatic recovery mode and a manual recovery mode one of which can be selected in advance by an administrator, etc. In the automatic recovery mode, the MCLAG device automatically changes the state of each MCLAG port group in response to the recovery from fault as shown in FIG. 4. On the other hand, in the manual recovery mode, the MCLAG device changes the state of each MCLAG port group upon reception of a command input by the administrator, etc. In other words, even if recovery from fault is completed, the MCLAG device maintains the state of each MCLAG port group shown in FIG. 3 until receiving a command input. For example, when the fault shown in FIG. 3 is an unstable fault, the situation in which the state of FIG. 3 and the state of FIG. 4 are alternately repeated may arise, but this situation can be prevented by selecting the manual recovery mode.

<<General Operation of Relay System (in the Occurrence of Fault at Bridge Port>>

Figure 5:
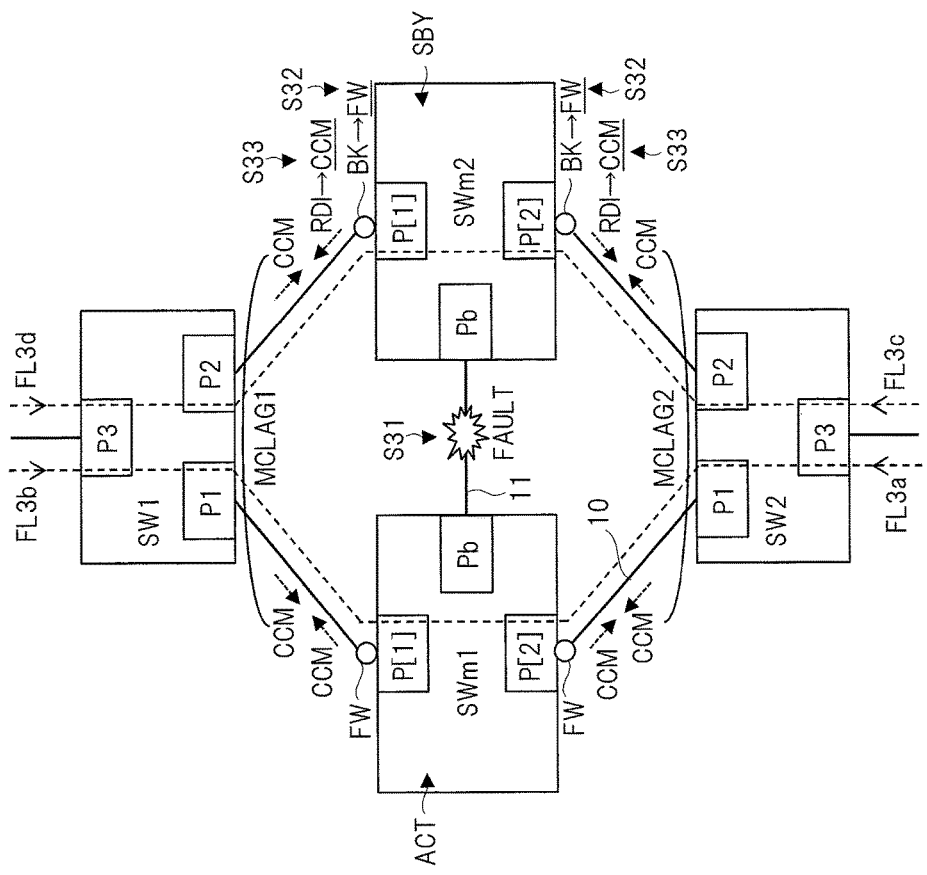
FIG. 5 is an explanatory diagram schematically showing an operation example in the occurrence of fault at the bridge port in the relay system of FIG. 1.

FIG. 5 is an explanatory diagram schematically showing an operation example in the occurrence of fault at the bridge port in the relay system of FIG. 1. Here, the case where a fault occurs on the communication line 11 connected to the bridge port Pb in the state of the absence of fault shown in FIG. 2 is taken as an example. In FIG. 5, first, the fault monitoring unit 15 of the L2 switching device SWm2 detects a fault occurrence at the bridge port Pb (step S31). When the fault monitoring unit 15 detects the fault occurrence at the bridge port Pb, the port control unit 14 of FIG. 1 controls the MCLAG port groups to the transmission/reception permitted state (first state) FW.

In the example of FIG. 5, the port control unit 14 of the L2 switching device SWm2 controls the MCLAG port groups P[1] and P[2] to the transmission/reception permitted state FW from the transmission/reception prohibited state BK in response to the fault occurrence at the bridge port Pb (step S32). Since the MCLAG port groups P[1] and P[2] are controlled to the transmission/reception permitted state FW, the L2 switching device SWm2 transmits CCM in place of RDI from the MCLAG ports P[1] and P[2] (step S33). Since each of the user L2 switching devices SW1 and SW2 receives the CCM from the L2 switching device SWm2 at the LAG port P2, each of the user L2 switching devices SW1 and SW2 transmits CCM from the LAG port P2.

Consequently, the user L2 switching device SW1 controls the LAG ports P1 and P2 to the transmission/reception enabled state, etc. and the user L2 switching device SW2 also controls the LAG ports P1 and P2 to the transmission/reception enabled state, etc. As a result, when relaying a frame received at the port P3 to the LAG ports P1 and P2, each of the L2 switching devices SW1 and SW2 selects one of the LAG ports P1 and P2 based on a predetermined distribution rule, and relays the frame to the selected port.

In this situation, the frame is transmitted and received in the following manner. In this example, since the process contents (learning and retrieval) on the address table FDB in the MCLAG devices (SWm1 and SWm2) are the same as those of FIG. 2 and others, detailed descriptions thereof are omitted. First, the case in which the user L2 switching device SW2 relays a frame FL3a received at the port P3 to the LAG port P1 based on the predetermined distribution rule is assumed. In this case, the L2 switching device SWm1 relays the frame FL3a containing the MCLAG identifier {MCLAG1} as a destination port and received at the MCLAG port group (MCLAG port) P[2] to the MCLAG port group (MCLAG port) P[1] based on the transmission/reception permitted state FW of the MCLAG port group P[1]. The user L2 switching device SW1 relays the frame FL3a received at the LAG port P1 to the port P3.

The case in which the user L2 switching device SW1 relays a frame FL3b received at the port P3 to the LAG port P1 in reverse based on the predetermined distribution rule is assumed. Also in this case, the L2 switching device SWm1 relays the frame FL3b containing the MCLAG identifier {MCLAG2} as a destination port and received at the MCLAG port group (MCLAG port) P[1] to the MCLAG port group (MCLAG port) P[2] based on the transmission/reception permitted state FW of the MCLAG port group P[2] in the same manner. The user L2 switching device SW2 relays the frame FL3b received at the LAG port P1 to the port P3.

Next, the case in which the user L2 switching device SW2 relays a frame FL3c received at the port P3 to the LAG port P2 based on the predetermined distribution rule is assumed. In this case, the L2 switching device SWm2 relays the frame FL3c containing the MCLAG identifier {MCLAG1} as a destination port and received at the MCLAG port group (MCLAG port) P[2] to the MCLAG port group (MCLAG port) P[1] based on the transmission/reception permitted state FW of the MCLAG port group P[1]. The user L2 switching device SW1 relays the frame FL3c received at the LAG port P2 to the port P3.

The case in which the user L2 switching device SW1 relays a frame FL3d received at the port P3 to the LAG port P2 in reverse based on the predetermined distribution rule is assumed. Also in this case, the L2 switching device SWm2 relays the frame FL3d containing the MCLAG identifier {MCLAG2} as a destination port and received at the MCLAG port group (MCLAG port) P[1] to the MCLAG port group (MCLAG port) P[2] based on the transmission/reception permitted state FW of the MCLAG port group P[2] in the same manner. The user L2 switching device SW2 relays the frame FL3d received at the LAG port P2 to the port P3.

<<General Operation of Relay System (in the Occurrence of Fault in MCLAG Device>>

Figure 6:
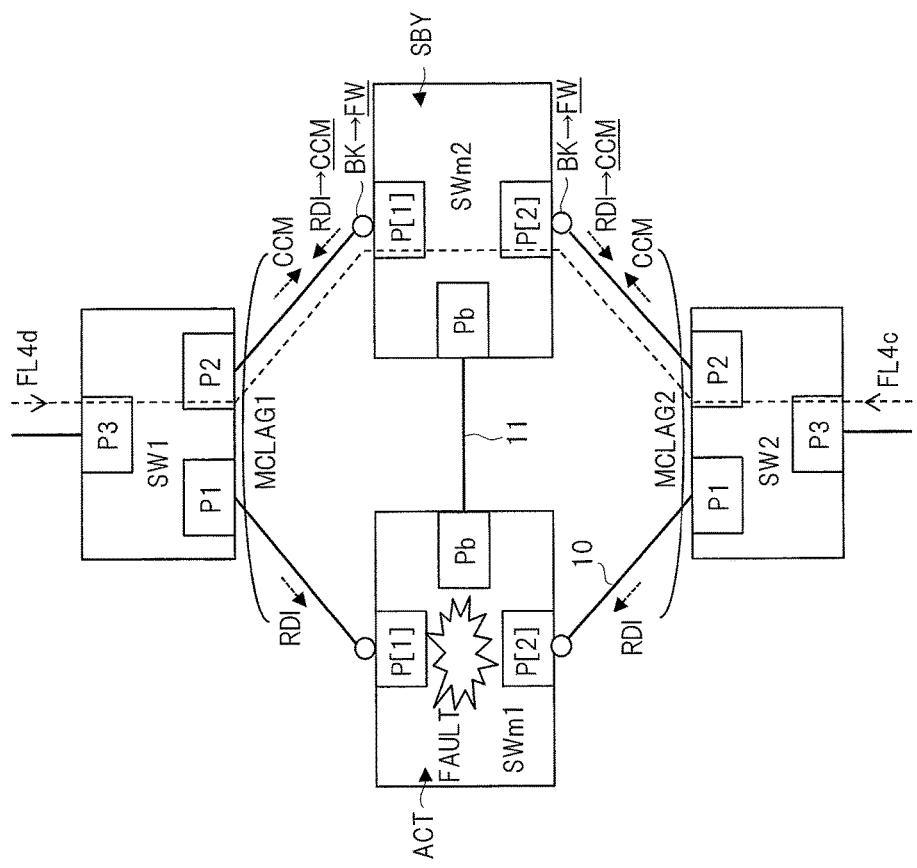
FIG. 6 is an explanatory diagram schematically showing an operation example in the occurrence of fault in one of the MCLAG devices in the relay system of FIG. 1.

FIG. 6 is an explanatory diagram schematically showing an operation example in the occurrence of fault in one of the MCLAG devices in the relay system of FIG. 1. Here, the case where a fault occurs in the L2 switching device SWm1 set to active ACT in the state of the absence of fault shown in FIG. 2 is taken as an example. The MCLAG devices (SWm1 and SWm2) handle a fault of one of the MCLAG devices (SWm1 in this example) in the same manner as the fault at the bridge port Pb shown in FIG. 5. In other words, when a fault occurs in the L2 switching device SWm1, the L2 switching device SWm2 eventually detects the occurrence of fault at the bridge port Pb.

Therefore, paths for frames FL4c and FL4d shown in FIG. 6 are determined to be the same as the paths for the frames FL3c and FL3d shown in FIG. 5. In the case of FIG. 6, however, the user L2 switching devices SW1 and SW2 detect the fault occurrence in the L2 switching device SWm1 because the user switching devices SW1 and SW2 cannot receive a CCM control frame (CCM, RDI) from the L2 switching device SWm1. As a result, the paths for the frames FL3a and FL3b shown in FIG. 5 are not created.

As described above, according to the relay system and the switching device of the first embodiment, the state of each port is properly controlled in accordance with a fault occurrence situation as shown in FIGS. 3 to 6. Hence, the system availability with the inclusion of the device fault can be easily improved.

<<Configuration of Switching Device>>

Figure 7:
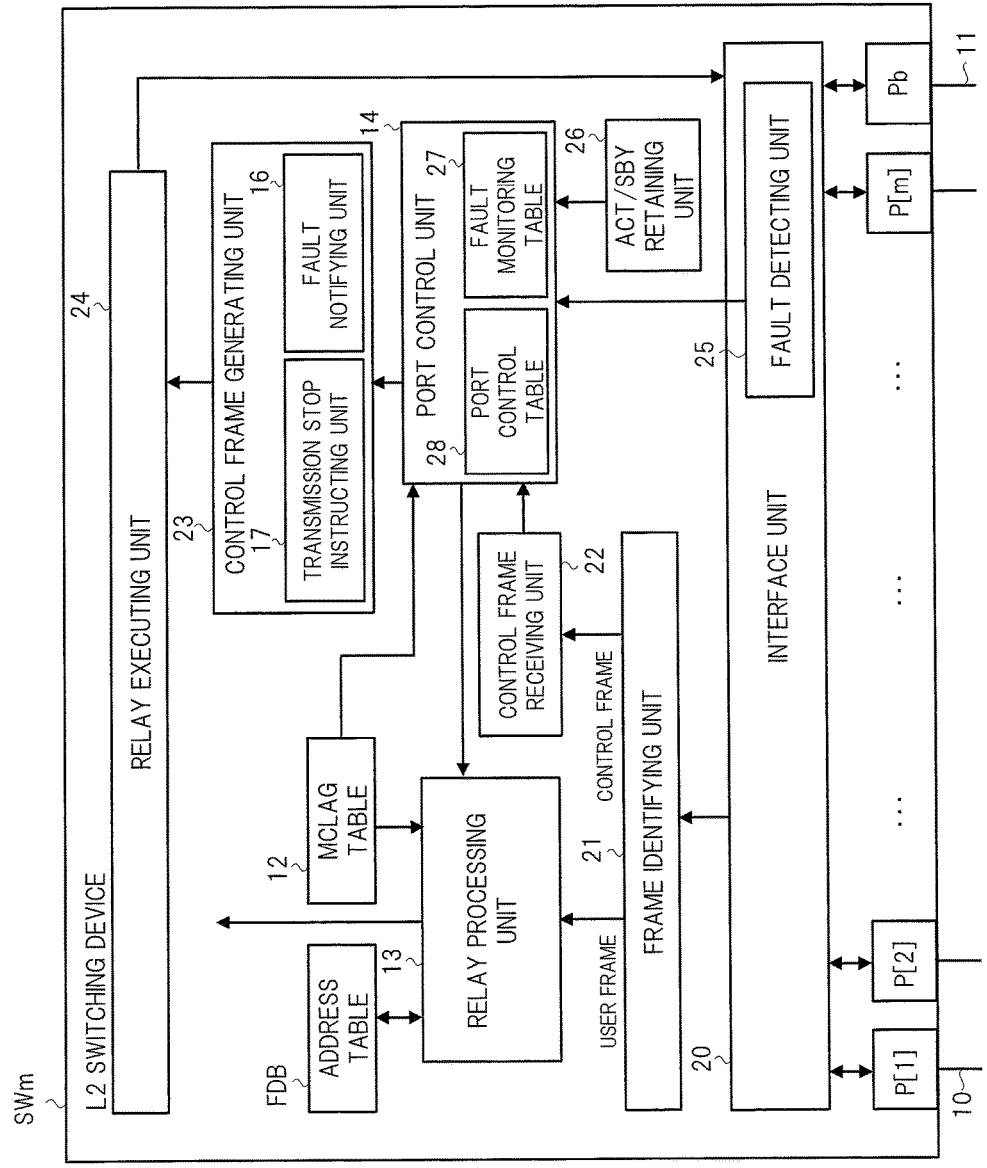
FIG. 7 is a block diagram of a configuration example of the principle part of the L2 switching device constituting the MCLAG device in the relay system of FIG. 1.

FIG. 7 is a block diagram of a configuration example of the principle part of the L2 switching device constituting the MCLAG device in the relay system of FIG. 1. FIG. 8A is a schematic diagram of a configuration example of the address table of FIG. 7, FIG. 8B is a schematic diagram of a configuration example of a fault monitoring table of FIG. 7, and FIG. 8C is a schematic diagram of a configuration example of a port control table of FIG. 7.

The L2 switching device (first or second switching device) SWm shown in FIG. 7 includes a plurality of ports (P[1] to P[m]), the bridge port Pb, various processing units, and various tables. At least one of the plurality of ports (P[1] to P[m]) is a MCLAG port group (MCLAG port) and the rest of the plurality of ports may be MCLAG port groups (MCLAG ports) or normal ports on which no MCLAG is set. In this example, for convenience, the ports P[1] and P[2] are assumed to be MCLAG port groups (MCLAG ports) and the port P[m] is assumed to be a normal port. Hereinafter, various processing units and tables will be described.

An interface unit 20 has a reception buffer and a transmission buffer, and transmits and receives a frame (user frame or control frame) to and from the plurality of ports (MCLAG port groups P[1] and P[2] and port P[m]) and the bridge port Pb. When receiving a frame at a port, the interface unit 20 adds a port identifier representing the port having received the frame (i.e., reception port identifier) to the frame. Also, the interface unit 20 has a fault detecting unit 25. The fault detecting unit 25 takes a part of the function of the fault monitoring unit 15 described with reference to FIG. 1 and others. The fault detecting unit 25 detects the fault occurrence and the recovery from fault at the plurality of ports (MCLAG port groups P[1] and P[2] and port P[m]) and the bridge port Pb with the use of hardware such as a detection circuit of the signal intensity of the received signal and a detection circuit of a pulse signal such as FLP.

A frame identifying unit 21 identifies whether the frame received at the plurality of ports (MCLAG port groups P[1] and P[2] and port P[m]) and the bridge port Pb and transmitted through the reception buffer of the interface unit 20 is a user frame or control frame. The user frame means an ordinary frame such as the frame FL1a of FIG. 2. The control frame means, for example, the CCM control frame based on Ethernet OAM (CCM, RDI) of FIG. 2, etc., the fault notification frame TRf of FIG. 3, and the fault recovery frame TRr of FIG. 4.

Though not particularly limited, the frame identifying unit 21 identifies whether the frame is a user frame or control frame based on frame type and a destination MAC address (e.g., destined for MCLAG device or not) contained in the frame. When the frame is identified as a user frame, the frame identifying unit 21 transmits the user frame to the relay processing unit 13. When the frame is identified as a control frame, the frame identifying unit 21 transmits the control frame to a control frame receiving unit 22.

The control frame receiving unit 22 detects the fault occurrence and recovery from fault at each port based on a control frame from the L2 switching devices connected to the MCLAG port groups P[1] and P[2] and from the different L2 switching device (referred to as peer device in this specification) connected to the bridge port Pb and constituting the MCLAG device together with its own switching device. Specifically, as shown in FIG. 2 and others, the control frame receiving unit 22 detects the fault occurrence and recovery from fault at the MCLAG port groups (MCLAG ports) P[1] and P[2] based on the state of reception of a CCM control frame from the user L2 switching device (SW1 or SW2). The state of reception of the CCM control frame is determined by, for example, whether the CCM control frame can be received within a predetermined period, whether the CCM control frame is CCM or RDI, etc.

Also, the MCLAG device can transmit and receive CCM control frames at regular intervals not only to and from the user L2 switching device but also to and from the peer device via the bridge port Pb. In this case, the control frame receiving unit 22 detects the fault occurrence and the recovery from fault at the bridge port Pb (or the peer device itself) based on the state of reception of a CCM control frame from the peer device. In this manner, the detection of the fault occurrence and the recovery from fault carried out by the control frame receiving unit 22 with the use of the CCM control frame takes another part of the function of the fault monitoring unit 15 described with reference to FIG. 1, etc. Furthermore, as described with reference to FIGS. 3 and 4, the control frame receiving unit 22 detects the fault occurrence and the recovery from fault at the MCLAG port group of the peer device based on the fault notification frame TRf and the fault recovery frame TRr received at the bridge port Pb.

An ACT/SBY retaining unit 26 retains setting information of active ACT or standby SBY in units of device (or in units of MCLAG port group) determined in advance by the administrator, etc. The MCLAG table 12 retains MCLAG port of its own switching device (e.g., P[1]) in association with a MCLAG identifier ({MCLAG1}) as shown in FIG. 1. As described above with reference to FIGS. 1 to 6, the port control unit 14 controls the states of the MCLAG port groups based on information of the MCLAG table 12, information of the control frame receiving unit 22, information of the fault detecting unit 25, and information of the ACT/SBY retaining unit 26.

Specifically, the port control unit 14 has, for example, a fault monitoring table 27 and a port control table 28. As shown in FIG. 8B, the fault monitoring table 27 retains the fault state (e.g., presence and absence of fault) of the MCLAG port (e.g., P[1]) and the bridge port Pb of its own switching device (e.g., SWm2) and the fault state of the MCLAG port group of the peer device (SWm1). The fault state of the MCLAG port group of the peer device (SWm1) is retained by using the MCLAG identifier thereof (e.g., {MCLAG1}). The fault state of the MCLAG port and bridge port Pb of its own switching device is determined by a part of the functions of the fault detecting unit 25 and control frame receiving unit 22 of FIG. 7 corresponding to the fault monitoring unit 15 of FIG. 1. The fault state of the MCLAG port group of the peer device is determined by the control frame receiving unit 22 and the MCLAG table 12.

The port control unit 14 controls the states of the MCLAG port groups of its own switching device based on the information of the fault monitoring table 27 and the information of the ACT/SBY retaining unit 26, and manages the control states in the port control table 28. The port control table 28 of FIG. 8C (and the fault monitoring table 27 of FIG. 8B) shows an example of contents retained in the case of the L2 switching device SWm2 of FIG. 3. In the example of the port control table 28 of FIG. 8C, the MCLAG port group P[1] of its own switching device corresponding to the MCLAG identifier {MCLAG1} is controlled to the transmission/reception permitted state FW and the MCLAG port group P[2] of its own switching device corresponding to the MCLAG identifier {MCLAG2} is controlled to the transmission/reception prohibited state BK.

Figure 9:
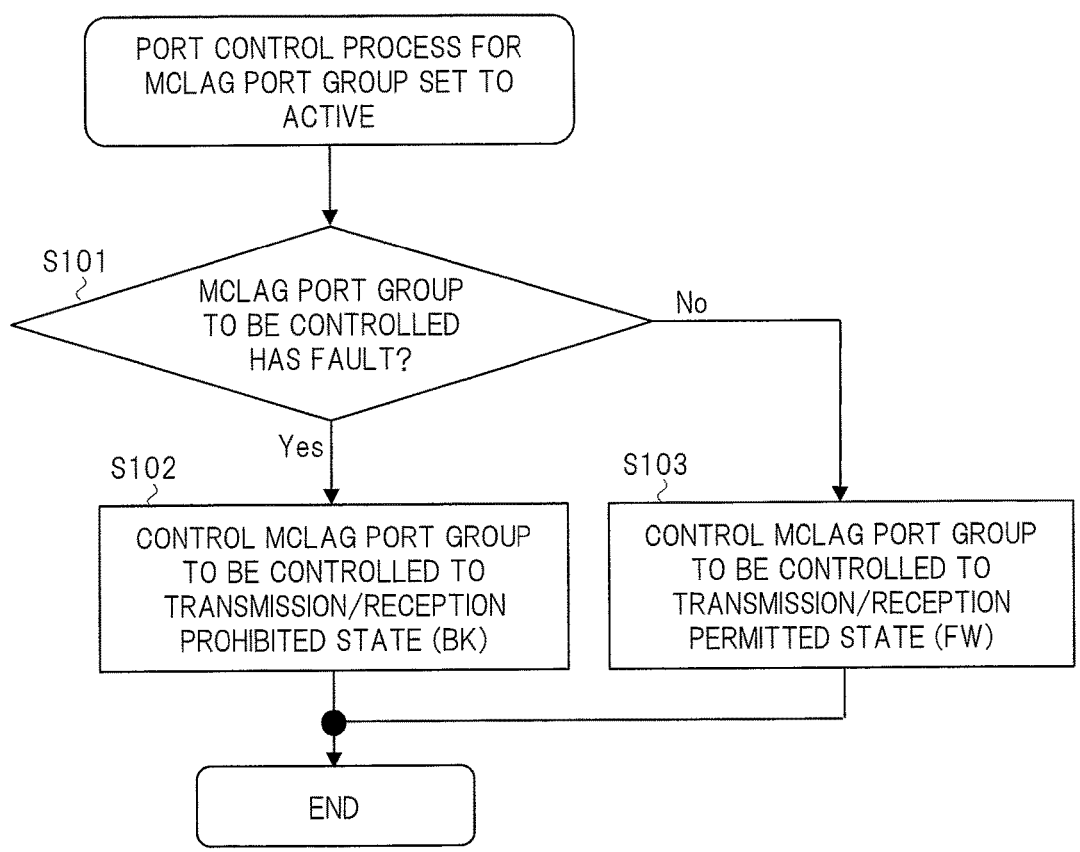
FIG. 9 is a flowchart schematically showing an example of process contents carried out by the port control unit of the L2 switching device of FIG. 7 when the L2 switching device is set to active.

FIG. 9 is a flowchart schematically showing an example of process contents carried out by the port control unit of the L2 switching device of FIG. 7 when the L2 switching device is set to active. In FIG. 9, the port control unit 14 determines whether a MCLAG port group to be controlled has a fault based on the fault monitoring table 27 (specifically, the detection result of the fault detecting unit 25 or the reception result of a CCM control frame by the control frame receiving unit 22) (step S101). When the MCLAG port group to be controlled has a fault, the port control unit 14 controls the MCLAG port group to the transmission/reception prohibited state BK (step S102). Meanwhile, when the MCLAG port group to be controlled has no fault, the port control unit 14 controls the MCLAG port group to the transmission/reception permitted state FW (step S103).

For example, in the case of the L2 switching device SWm1 of FIG. 3, the MCLAG port groups to be controlled are the MCLAG port groups P[1] and P[2]. Since the MCLAG port group P[1] has a fault, the port control unit 14 controls the MCLAG port group P[1] to the transmission/reception prohibited state BK (step S102). Also, since the MCLAG port group P[2] has no fault, the port control unit 14 controls the MCLAG port group P[2] to the transmission/reception permitted state FW (step S103).

Figure 10:
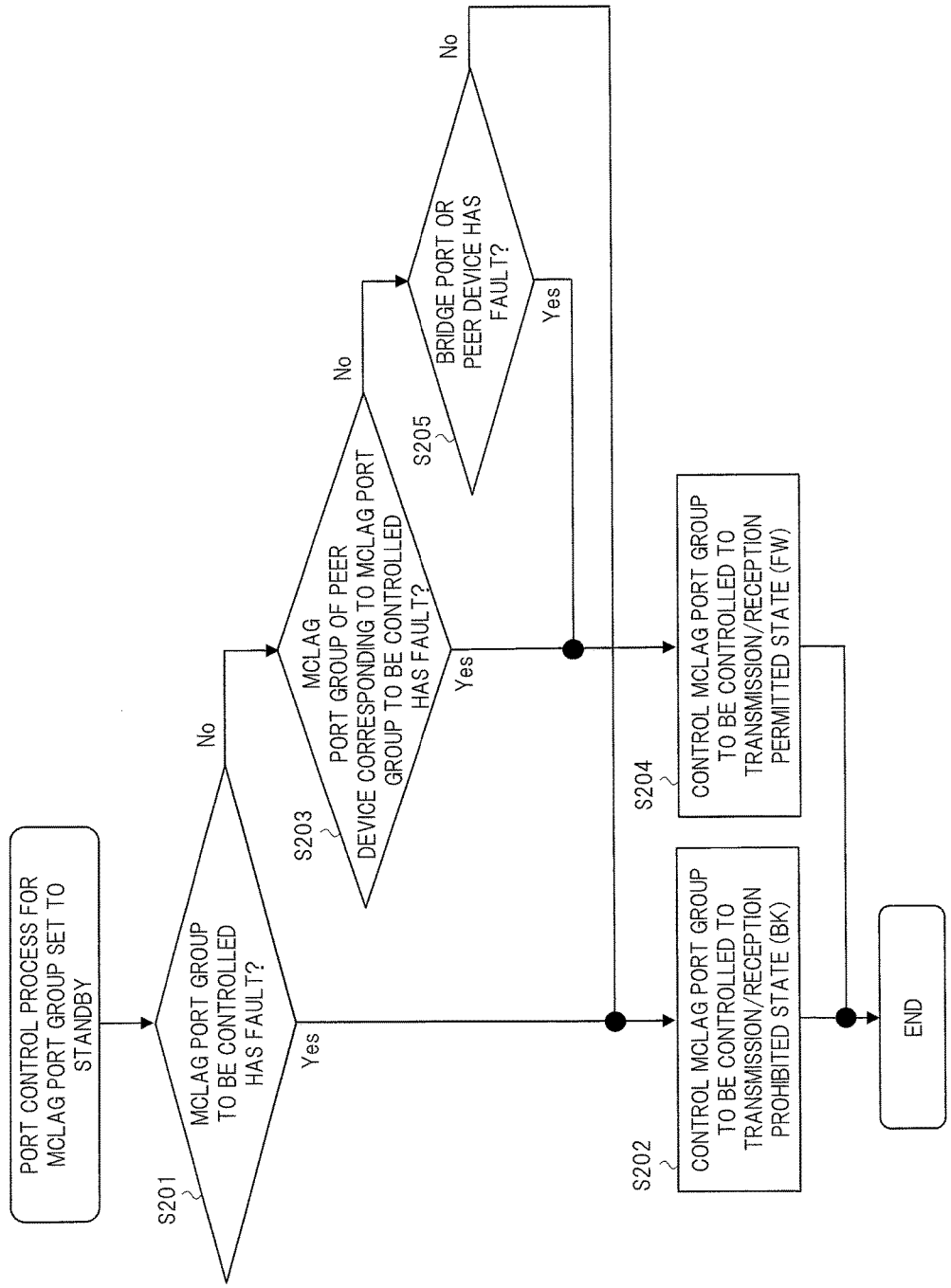
FIG. 10 is a flowchart schematically showing an example of process contents carried out by the port control unit of the L2 switching device of FIG. 7 when the L2 switching device is set to standby.

FIG. 10 is a flowchart schematically showing an example of process contents carried out by the port control unit of the L2 switching device of FIG. 7 when the L2 switching device is set to standby. In FIG. 10, the port control unit 14 determines whether a MCLAG port group to be controlled has a fault based on the fault monitoring table 27 (specifically, the detection result of the fault detecting unit 25 or the reception result of a CCM control frame by the control frame receiving unit 22) (step S201). When the MCLAG port group to be controlled has a fault, the port control unit 14 controls the MCLAG port group to the transmission/reception prohibited state BK (step S202).

Also, when the MCLAG port group to be controlled has no fault, the port control unit 14 determines whether the MCLAG port group of the peer device corresponding to the MCLAG port group to be controlled has a fault based on the fault monitoring table 27 (specifically, the reception result of fault notification frame/fault recovery frame by the control frame receiving unit 22) (step S203). When the MCLAG port group of the peer device has a fault, the port control unit 14 controls the MCLAG port group to be controlled to the transmission/reception permitted state FW (step S204).

Also, when the MCLAG port group of the peer device has no fault, the port control unit 14 determines whether the bridge port Pb has a fault based on the fault monitoring table 27 (specifically, the detection result of the fault detecting unit 25 or the reception result of the CCM control frame by the control frame receiving unit 22) (step S205). When the bridge port Pb has a fault, the port control unit 14 controls the MCLAG port group to be controlled to the transmission/reception permitted state FW (step S204). Meanwhile, when the bridge port Pb has no fault, the port control unit 14 controls the MCLAG port group to be controlled to the transmission/reception prohibited state BK (step S202).

For example, in the case of the L2 switching device SWm2 of FIG. 3, the MCLAG port groups to be controlled are the MCLAG port groups P[1] and P[2]. With respect to the MCLAG port groups P[1], the port control unit 14 recognizes that the MCLAG port group P[1] of its own switching device (SWm2) has no fault and the MCLAG port group P[1] of the peer device (SWm1) has a fault, and therefore, the port control unit 14 controls the MCLAG port group P[1] of its own switching device (SWm2) to the transmission/reception permitted state FW (step S204). Also, with respect to the MCLAG ports P[2], the port control unit 14 recognizes that any of the MCLAG port group P[2] of its own switching device (SWm2), the MCLAG port group P[2] of the corresponding peer device (SWm1), and the bridge port Pb has no fault, and therefore, the port control unit 14 controls the MCLAG port group P[2] of its own switching device (SWm2) to the transmission/reception prohibited state BK (step S202).

For example, example, in the case of the L2 switching device SWm2 of FIG. 5, the MCLAG port groups to be controlled are the MCLAG port groups P[1] and P[2]. With respect to the MCLAG port groups P[1], the port control unit 14 recognizes that the MCLAG port groups P[1] of its own switching device (SWm2) and the peer device (SWm1) have no fault but the bridge port Pb has a fault, and therefore, the port control unit 14 controls the MCLAG port group P[1] of its own switching device (SWm2) to the transmission/reception permitted state FW (step S204). Similarly, with respect to the MCLAG port groups P[2], the port control unit 14 recognizes that the MCLAG port groups P[2] of its own switching device (SWm2) and the peer device (SWm1) have no fault but the bridge port Pb has a fault, and therefore, the port control unit 14 controls the MCLAG port group P[2] of its own switching device (SWm2) to the transmission/reception permitted state FW (step S204).

Figure 11:
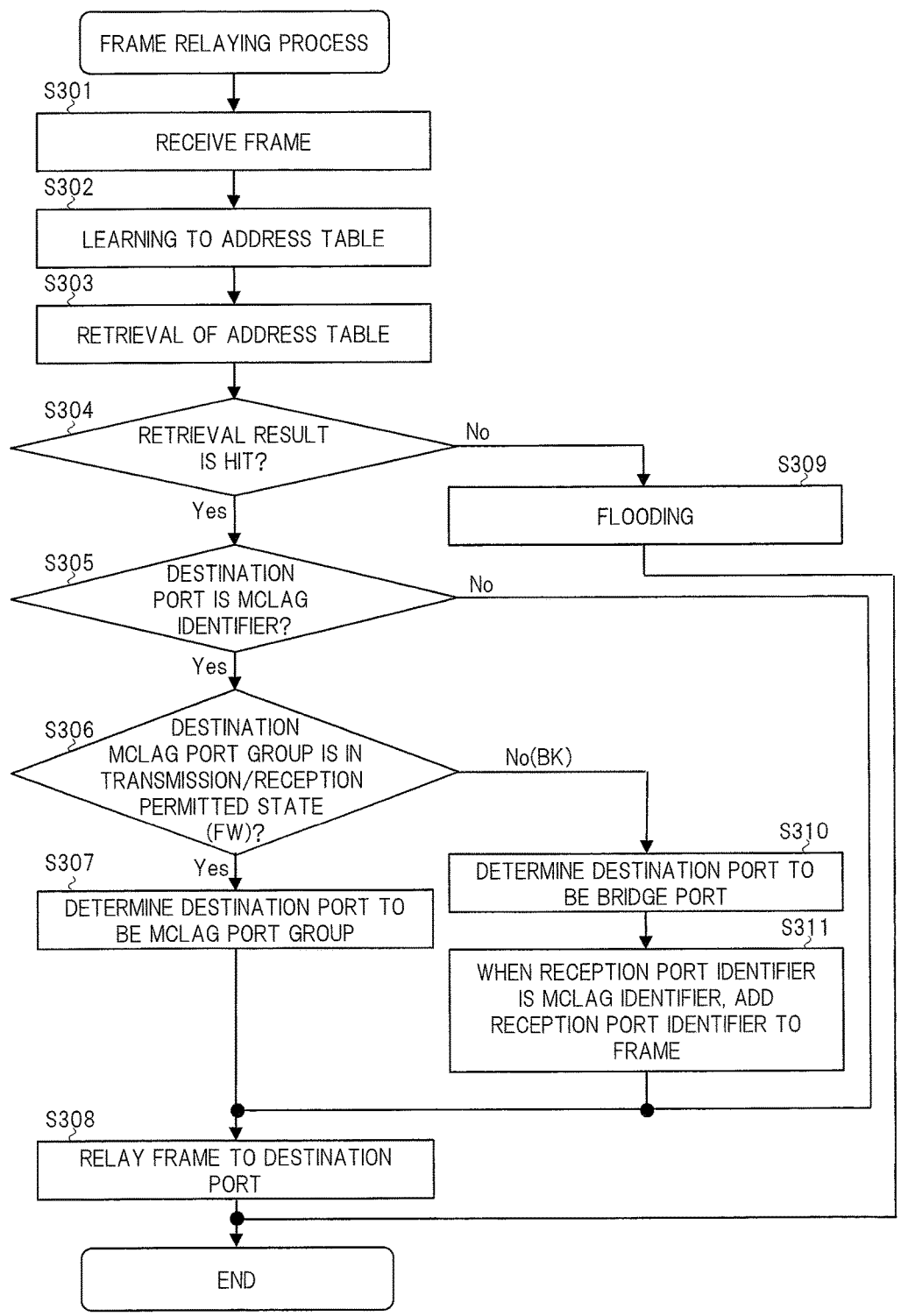
FIG. 11 is a flowchart schematically showing an example of process contents carried out by the relay processing unit of the L2 switching device of FIG. 7.

In FIG. 7, the relay processing unit 13 determines a destination port for a user frame from the frame identifying unit 21 by performing the learning and retrieval on the address table FDB and reflecting information of the port control unit 14 (specifically, the port control table 28) as described above with reference to FIGS. 1 to 6. FIG. 11 is a flowchart schematically showing an example of process contents carried out by the relay processing unit of the L2 switching device of FIG. 7. In FIG. 11, the relay processing unit 13 receives a frame (user frame) from the frame identifying unit 21 (step S301) and learns a source MAC address thereof in association with a reception port identifier to the address table FDB (step S302).

As described above, the reception port identifier is added to the frame by the interface unit 20. However, when the reception port identifier is a port identifier of a MCLAG port (e.g., {P[1] }) based on the MCLAG table 12, the relay processing unit 13 learns the MCLAG identifier ({MCLAG1}) of the MCLAG port in place of the reception port identifier to the address table FDB. Furthermore, as described above with reference to FIG. 1, etc., when a frame to which a reception port identifier has already been added is received at the bridge port Pb, the relay processing unit 13 learns a source MAC address contained in the frame in association with the reception port identifier to the address table FDB.

As a result, the address table FDB retains the correspondence relation between the ports and the MAC addresses present ahead of the ports as shown in FIG. 8A. In FIG. 8A, a port is retained as the port identifier thereof (e.g., {P[m]}) or the MCLAG identifier thereof (e.g., {MCLAG1}). Actually, the address table FDB retains VLAN (Virtual Local Area Network) identifiers in addition to MAC addresses.

Subsequently, the relay processing unit 13 performs the retrieval on the address table FDB with using a destination MAC address (and a VLAN identifier) of the frame as a retrieval key, thereby acquiring a destination port (step S303). When the retrieval result is hit (step S304), the relay processing unit 13 determines whether the destination port is a MCLAG identifier (step S305). When the destination port is a MCLAG identifier, the relay processing unit 13 determines whether the destination MCLAG port group corresponding to the MCLAG identifier is in the transmission/reception permitted state FW based on the information of the port control unit 14 (specifically, the port control table 28) (step S306).

When the destination MCLAG port group is in the transmission/reception permitted state FW, the relay processing unit 13 determines the destination port to be the destination MCLAG port group (MCLAG port) (step S307). The relay processing unit 13 then relays the frame to the destination port (step S308). Specifically, the relay processing unit 13 adds the port identifier (that is, destination port identifier) representing the destination port (e.g., {P[1]}) to the frame and relays the frame to a relay executing unit 24.

Meanwhile, when the destination MCLAG port group is not in the transmission/reception permitted state FW (that is, in the transmission/reception prohibited state BK) at step S306, the relay processing unit 13 determines the destination port to be the bridge port Pb (step S310). Furthermore, when the reception port identifier is a MCLAG identifier, the relay processing unit 13 adds the reception port identifier (MCLAG identifier) to the frame (step S311). The relay processing unit 13 then relays the frame, to which the reception port identifier is added, to the destination port (step S308). Specifically, the relay processing unit 13 further adds the destination port identifier {Pb} to the frame and then relays the frame to the relay executing unit 24.

Also, when the retrieval result of the address table FDB is mishit at step S304, the relay processing unit 13 floods the frame in a VLAN to which the frame belongs (step S309). For example, the case in which the retrieval result with respect to the frame FL1a in the L2 switching device SWm1 is mishit in FIG. 2 is assumed. In this case, the relay processing unit 13 of the L2 switching device SWm1 determines the ports (P[1] and Pb) other than the MCLAG port group P[2] (i.e., the port having received the frame FL1a) to be the candidates for flooding. In this case, since the MCLAG port group P[1] is in the transmission/reception permitted state FW, the relay processing unit 13 floods the frame FL1a to both of the MCLAG port group (MCLAG port) P[1] and the bridge port Pb.

Meanwhile, when the retrieval result is mishit, the relay processing unit 13 of the L2 switching device SWm2 having received the frame FL1a at the bride port Pb determines the ports (P[1] and P[2]) other than the port (Pb) having received the frame FL1a to be candidates for flooding. However, since both of the MCLAG port groups P[1] and P[2] are in the transmission/reception prohibited state BK, the relay processing unit 13 does not carry out the flooding.

In this manner, in the first embodiment, since one of the MCLAG port groups of each of the L2 switching devices constituting the MCLAG devices is controlled to the transmission/reception prohibited state BK except for the case when a fault occurs at the bridge port Pb, the looping back and the duplicate transmission of frames in the MCLAG do not occur. However, in order to further enhance the reliability, the looping back of frames may be prevented based on a reception port identifier added to a frame received at the bridge port Pb. For example, the relay processing unit 13 of the L2 switching device SWm2 having received the frame FL1a at the bridge port Pb prevents the flooding to the MCLAG port group P[2] based on the reception port identifier ({MCLAG2}) added to the frame FL1a.

Also, when the destination port is not a MCLAG identifier at step S305 of FIG. 11, the relay processing unit 13 relays the frame to the destination port acquired as the retrieval result of the address table FDB (step S308). Specifically, the relay processing unit 13 adds the destination port identifier representing the destination port to the frame and relays the frame to the relay executing unit 24. Note that the case where the destination port is not a MCLAG port corresponds to, for example, the case where the destination port is a normal port (P[m] in this example).

In FIG. 7, a control frame generating unit 23 has the fault notifying unit 16 and the transmission stop instructing unit 17. The fault notifying unit 16 generates the fault notification frame TRf described with reference to FIG. 3 and the fault recovery frame TRr described with reference to FIG. 4 based on the fault monitoring table 27 (specifically, the detection result by the fault detecting unit 25 or reception result of the CCM control frame by the control frame receiving unit 22). In addition to these frames, the control frame generating unit 23 generates the CCM control frame based on Ethernet OAM (CCM, RDI). In other words, the control frame generating unit 23 constitutes an OAM processing unit, which transmits and receives CCM control frames between predetermined MEPs based on the Ethernet OAM standards, together with the control frame receiving unit 22 which monitors the reception state of the CCM control frame described above.

When generating a CCM control frame, the control frame generating unit 23 generates the CCM control frame for a port controlled to the transmission/reception permitted state FW with reference to the port control table 28 based on the general Ethernet OAM standards. On the other hand, for a port controlled to the transmission/reception prohibited state BK, the control frame generating unit 23 transmits RDI by using the transmission stop instructing unit 17 unlike the general Ethernet OAM standards as described with reference to FIGS. 1 and 2, etc. The control frame generating unit 23 adds a predetermined destination port identifier based on a MEP set in advance to a generated frame, and transmits the frame to the relay executing unit 24.

The relay executing unit 24 transmits a frame (user frame or control frame) from the relay processing unit 13 or the control frame generating unit 23 to the predetermined transmission buffer in the interface unit 20. This predetermined transmission buffer corresponds to a destination port identifier added to the frame. Upon reception of the frame from the relay executing unit 24, the transmission buffer in the interface unit 20 transmits the frame to the corresponding port.

In the configuration example of FIG. 7, the case where the retained contents of the address tables FDB are different from each other between one MCLAG device (SWm1) and the other MCLAG device (SWm2) (that is, the case where an entry present in one address table FDB is not present in the other address table FDB) may arise. Even in such a case, the malfunction does not occur by performing the flooding. However, in order to suppress communication congestion due to the flooding, a mechanism to synchronize the retained contents of the address tables FDB may be provided.

As described above, by using the relay system and the switching device of the first embodiment, typically, network management can be facilitated.

Second Embodiment

<<General Configuration of Relay System (Application Example [1])>>

Figure 12:
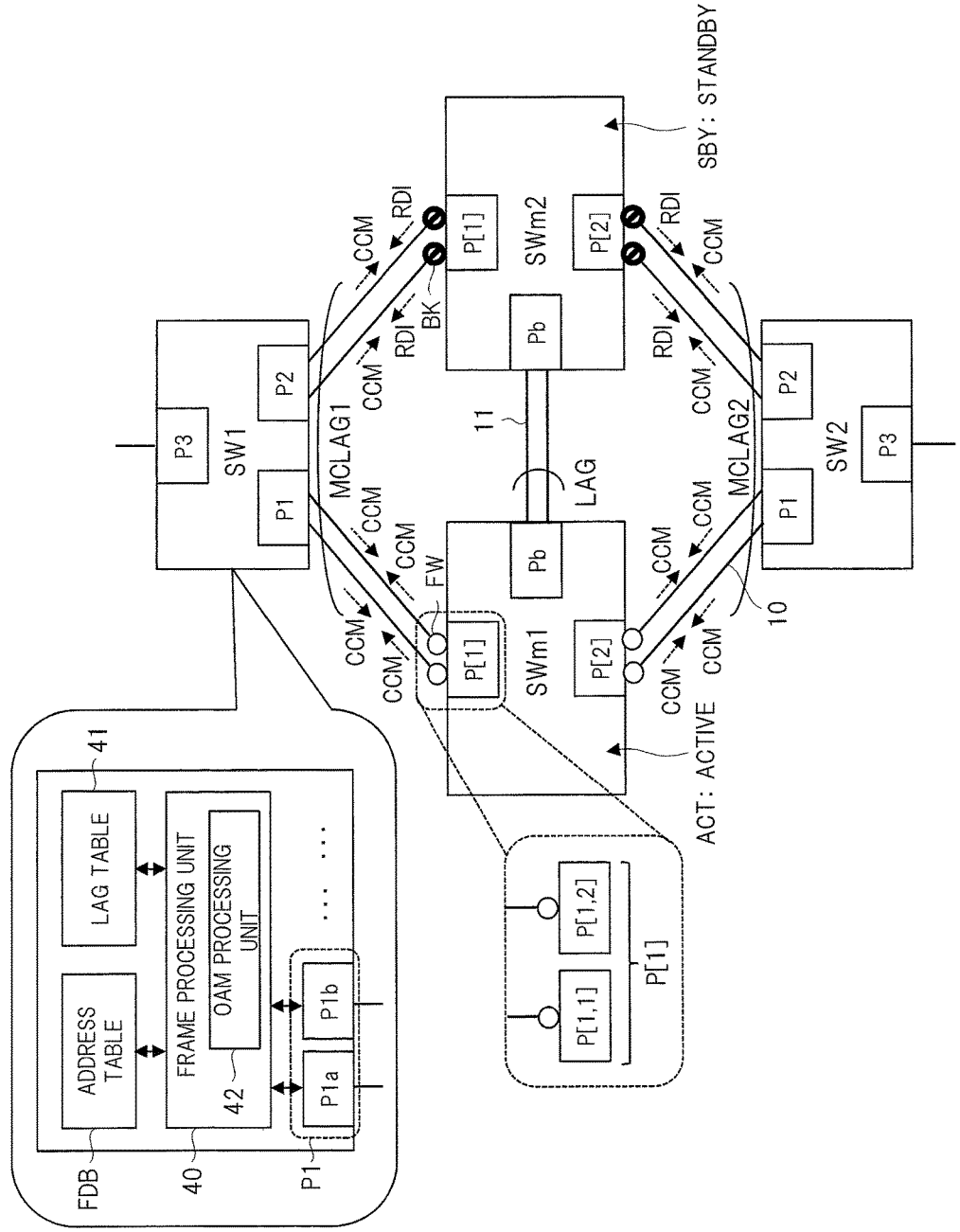
FIG. 12 is a schematic diagram of a configuration example and a part of operation example of a relay system according to the second embodiment of the present invention.

FIG. 12 is a schematic diagram of a configuration example and a part of operation example of a relay system according to the second embodiment of the present invention. The relay system of FIG. 12 is different from the relay system of FIG. 1 in that each of the MCLAG port groups P[1] and P[2] of the MCLAG device is made up of n (n=2 in this case) MCLAG ports and the bridge port Pb is also made up of a plurality of (two in this case) bridge ports. Consequently, switching devices are connected via a plurality of communication lines 10. As a typical example thereof, in FIG. 12, the MCLAG port group (first port group) P[1] is made up of two MCLAG ports (first ports) P[1,1] and P[1,2], and the two MCLAG ports P[1,1] and P[1,2] are connected to the L2 switching device SW1 via the communication lines 10, respectively.

Also, FIG. 12 shows a simplified configuration example of the user L2 switching devices SW1 and SW2. The L2 switching device (typically, SW1) has LAG ports P1a, P1b, . . . , a frame processing unit 40, an address table FDB, and a LAG table 41. The LAG ports P1a and P1b constitute the LAG port P1 and are connected to the MCLAG ports P[1,1] and P[1,2] of the L2 switching devices SWm1 via the communication lines 10, respectively. Though not shown, the L2 switching device SW1 has n (n=2 in this case) LAG ports P2a and P2b constituting the LAG port P2.

Like the case of FIG. 8A, the address table FDB retains the correspondence relation between a port (actually, port identifier or LAG identifier), a MAC address present ahead of the port, and a VLAN identifier. The LAG table 41 retains the correspondence relation between a LAG identifier and port identifiers of member ports of the LAG identifier like the case of the MCLAG table 12 of FIG. 1. For example, the LAG table 41 retains the correspondence relation between the LAG identifier {LAG1} corresponding to the MCLAG1 and port identifiers {P1a} and {P1b} (and {P2a} and {P2b}) of the member ports of the LAG identifier {LAG1}.

When receiving a frame at a predetermined port, the frame processing unit 40 carries out the learning and retrieval on the address table FDB with reference to the LAG table 41 when necessary, and relays the frame to a destination port based on the retrieval result thereof. Also, the frame processing unit 40 has an OAM processing unit 42. The OAM processing unit 42 transmits and receives a CCM control frame (CCM, RDI) between MEPs set in advance (ports in this example) based on the general Ethernet OAM standards, thereby monitoring the presence and absence of fault at each port.

The MCLAG1 is set on the MCLAG ports P[1,1] and P[1,2] of the L2 switching device SWm1 and the MCLAG ports P[1,1] and P[1,2] of the L2 switching device SWm2. Similarly, the MCLAG2 is set on the four MCLAG ports (P[2,1] and P[2,2] of SWm1 and SWm2 (not shown)) constituting the MCLAG port groups P[2] of the L2 switching devices SWm1 and SWm2. Also, the LAG is set on the plurality of bridge ports constituting the bride port Pb.

Like the case of FIG. 1, the MCLAG port groups P[1] and P[2] of the L2 switching device SWm1 are controlled to the transmission/reception permitted state FW, and the MCLAG port groups P[1] and P[2] of the L2 switching device SWm2 are controlled to the transmission/reception prohibited state BK. More specifically, each of the MCLAG ports P[1,1] and P[1,2] (and P[2,1] and P[2,2]) of the L2 switching device SWm1 is controlled to the transmission/reception permitted state FW, and each of the MCLAG ports P[1,1] and P[1,2] (and P[2,1] and P[2,2]) of the L2 switching device SWm2 is controlled to the transmission/reception prohibited state BK.

Here, the L2 switching device SWm1 and the L2 switching device SW1 configure the MCLAG port P[1,1] of the L2 switching device SWm1 and the LAG port P1a of the L2 switching device SW1 as MEPs (MEP1s), respectively, and configure the MCLAG port P[1,2] and the LAG port P1b as MEPs (MEP2s), respectively. Then, the L2 switching device SWm1 and the L2 switching device SW1 both transmit and receive CCM control frames between the MEP1s at regular intervals, and also transmit and receive CCM control frames between the MEP2s at regular intervals. In the same manner, each L2 switching device properly configures MEPs at each port and transmits and receives CCM control frames between each of the MEPs at regular intervals.

The transmission stop instructing unit 17 (see FIG. 1) of the L2 switching device SWm2 transmits RDI from the two MCLAG ports P[1,1] and P[1,2] controlled to the transmission/reception prohibited state BK, respectively, and also transmits RDI from the two MCLAG ports P[2,1] and P[2,2] (not shown) controlled to the transmission/reception prohibited state BK, respectively. As a result, each of the user L2 switching devices SW1 and SW2 eliminates the two LAG ports (P2a and P2b (not shown)) constituting the LAG port P2 from candidates for the transmission ports in a predetermined LAG (MCLAG).

The relay system of FIG. 12 operates in the same manner as the relay system of the first embodiment. For example, by properly determining what state of fault occurrence at the MCLAG ports P[1,1] and P[1,2] is to be regarded as the fault occurrence at the MCLAG port group P[1] shown in FIG. 3, the relay system of FIG. 12 operates in the same manner as that of the relay system of the first embodiment. For example, the fault occurrence at one of the MCLAG ports P[1,1] and P[1,2] may be regarded as the fault occurrence at the MCLAG port group P[1], and the fault occurrence at both of the MCLAG ports P[1, 1] and P[1,2] may also be regarded as the fault occurrence at the MCLAG port group P[1].

For example, the case in which a fault occurs at the MCLAG port P[1,1] of the L2 switching device SWm1 in the former case is assumed. In this case, the MCLAG port P[1,2] of the L2 switching device SWm1 is also controlled to the transmission/reception prohibited state BK together with the MCLAG port P[1,1], and the MCLAG ports P[1,1] and P[1,2] of the L2 switching device SWm2 are both controlled to the transmission/reception permitted state FW. Meanwhile, the case in which a fault occurs at the MCLAG port P[1,1] of the L2 switching device SWm1 in the latter case is assumed. In this case, the MCLAG port P[1,2] of the L2 switching device SWm1 remains in its transmission/reception permitted state FW, and the MCLAG ports P[1,1] and P[1,2] of the L2 switching device SWm2 remain in their transmission/reception prohibited state BK.

<<Configuration of Switching Device (Application Example [1])>>

Figure 13:
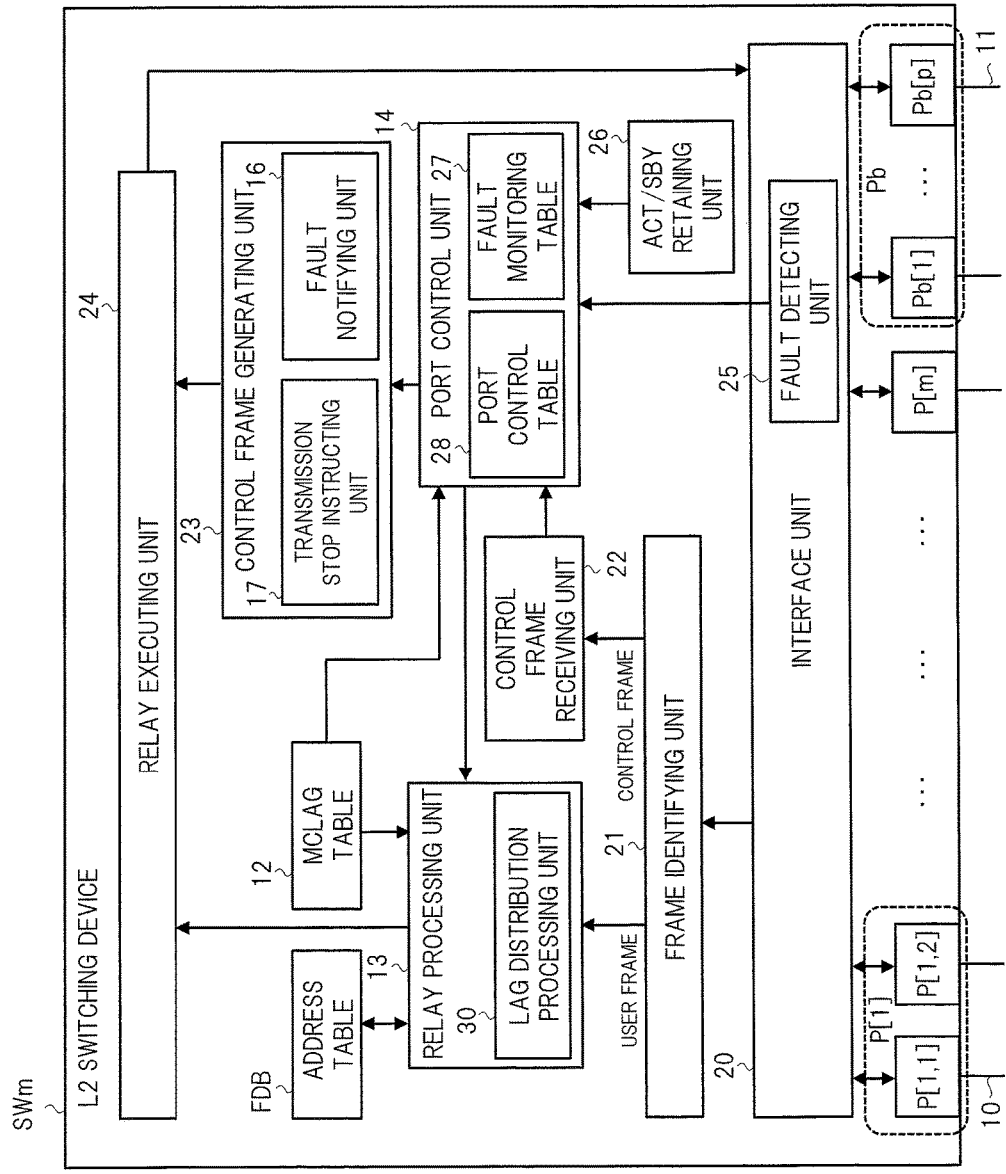
FIG. 13 is a block diagram of a configuration example of the principle part of the L2 switching device constituting the MCLAG device in the relay system of FIG. 12.

FIG. 13 is a block diagram of a configuration example of the principle part of the L2 switching device constituting the MCLAG device in the relay system of FIG. 12. The L2 switching device (first or second switching device) SWm of FIG. 13 is different from the configuration example shown in FIG. 7 in the following respects. First, in FIG. 13, the MCLAG port group P[1] is made up of a plurality of MCLAG ports P[1,1] and P[1,2] and the bridge port Pb is also made up of a plurality of bridge ports Pb[1] to Pb[p]. Secondly, in FIG. 13, the relay processing unit 13 has a LAG distribution processing unit 30. Since the configuration and operation other than these respects are the same as those of the case of FIG. 7, detailed descriptions thereof are omitted.

When relaying a frame to the MCLAG port group P[1], the L2 switching device SWm of FIG. 13 selects one of the MCLAG ports P[1,1] and P[1,2] by using the LAG distribution processing unit 30. For example, the case in which a destination port of a frame received at a predetermined port is the MCLAG identifier {MCLAG1} based on the retrieval result of the address table FDB by the relay processing unit 13 is assumed. Also, the MCLAG ports P[1,1] and P[1,2] are assumed to be controlled to the transmission/reception permitted state FW.

In this case, the LAG distribution processing unit 30 recognizes that its own MCLAG ports to be the member ports of the MCLAG identifier {MCLAG1} are the MCLAG ports P[1,1] and P[1,2] based on the MCLAG table 12. The LAG distribution processing unit 30 then performs a hash operation by using, for example, a source MAC address, a destination MAC address, etc., of the frame, and selects one of the MCLAG ports P[1,1] and P[1,2] based on the result of the hash operation. The LAG distribution processing unit 30 adds a destination port identifier representing the selected port to the frame, and transmits the frame to the relay executing unit 24.

As described above, by using the relay system and the switching device of the second embodiment, the improvement in a communication band obtained by using a plurality of communication lines based on LAG (or MCLAG) for the connection between devices and the further improvement in availability can be achieved in addition to the various effects described in the first embodiment.

Third Embodiment

<<General Configuration of Switching Device (Modification Example [2])

Figure 14:
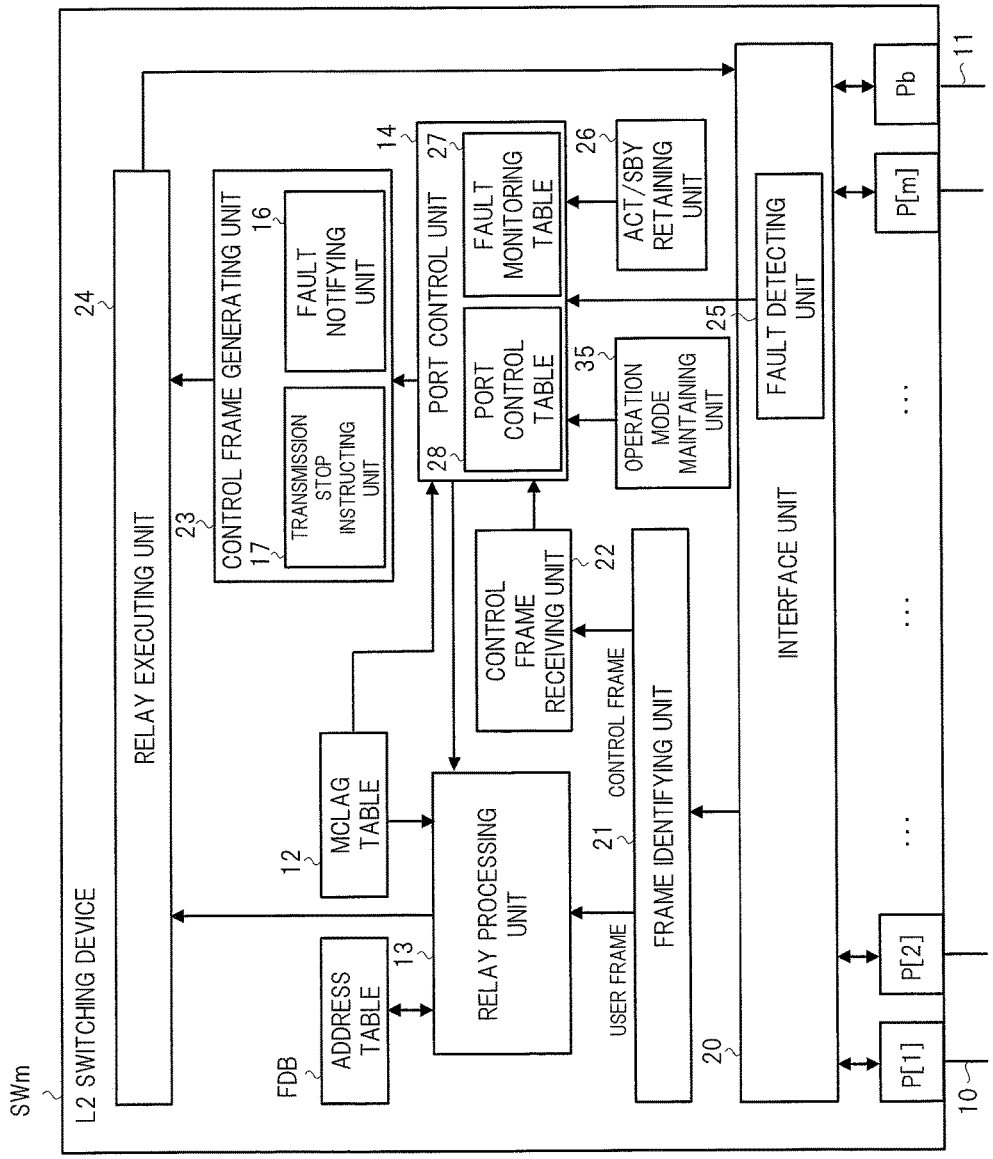
FIG. 14 is a schematic diagram of a configuration example of a switching device according to the third embodiment of the present invention.

FIG. 14 is a schematic diagram of a configuration example of a switching device according to the third embodiment of the present invention. The L2 switching device (first or second switching device) SWm of FIG. 14 is different from the configuration example of FIG. 7 in that an operation mode maintaining unit 35 is further provided and new operations are accordingly added to the control unit 28 and the relay processing unit 13. The operation mode maintaining unit 35 maintains a reception prohibited mode (first mode) or a reception permitted mode (second mode) set in advance by the administrator, etc.

When the reception prohibited mode (first mode) is maintained, the port control unit 28 controls a MCLAG port group set to standby SBY to the transmission/reception prohibited state BK in the same manner as the first embodiment, and the relay processing unit 13 also carries out the same process as that of the first embodiment. Meanwhile, when the reception permitted mode (second mode) is maintained, the port control unit 28 controls a MCLAG port group set to standby SBY to a transmission prohibited state (third state) TBK in which reception is permitted but transmission is prohibited. When a MCLAG port group is controlled to the transmission prohibited state TBK, the relay processing unit 13 relays a frame containing the MCLAG identifier of the MCLAG port group as a destination port to the bridge port Pb.

<<General Operation of Relay System ( Application Example [2]) (in the Absence of Fault)>>

Figure 15A:
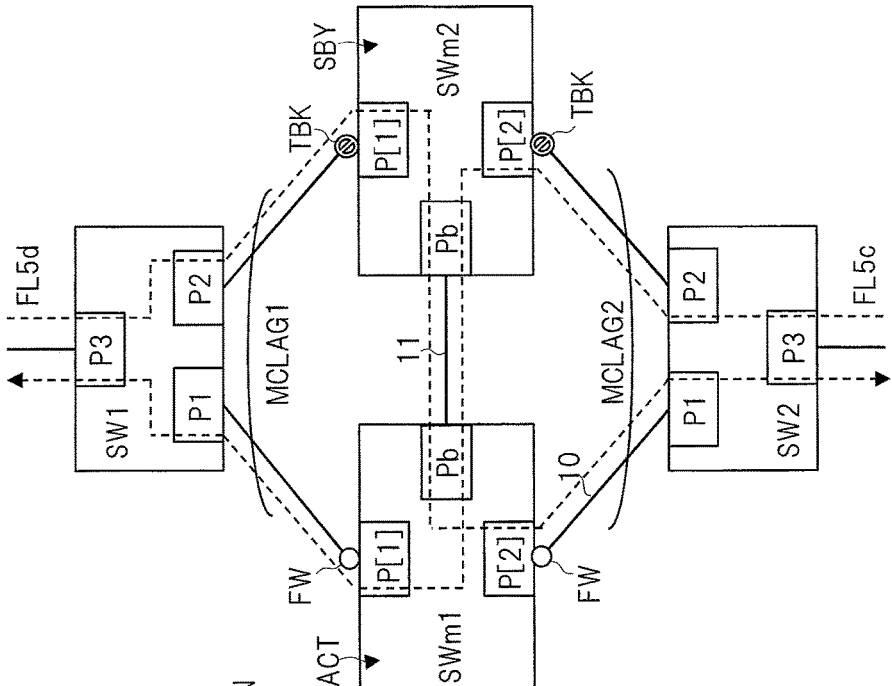
FIG. 15A is an explanatory diagram schematically showing an operation example in the absence of fault in the relay system using the L2 switching device of FIG. 14.
Figure 15B:
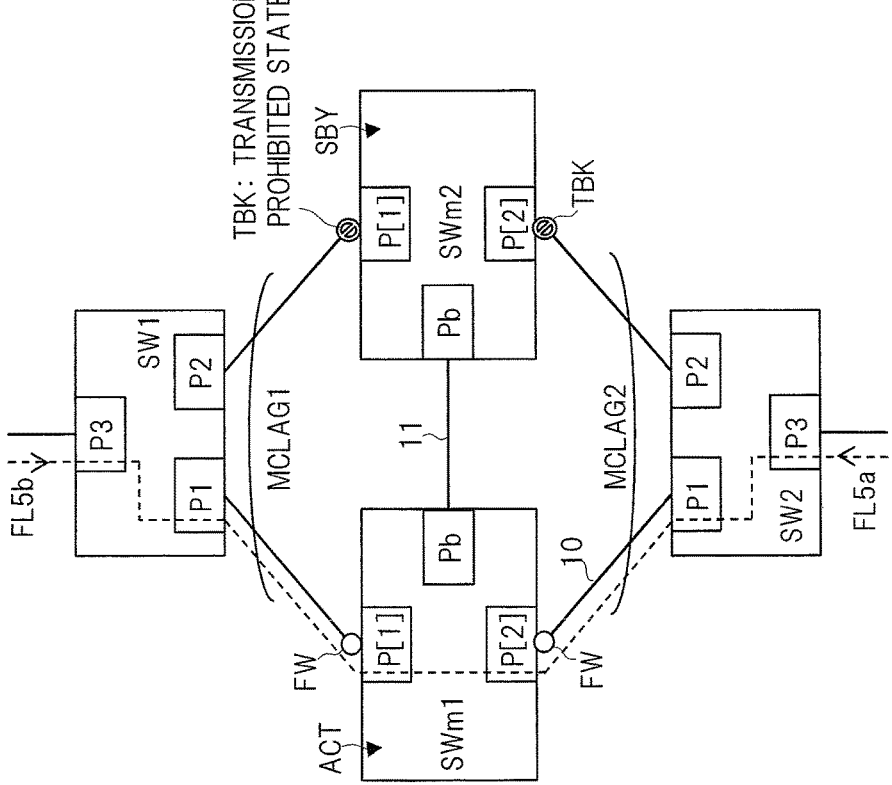
FIG. 15B is an explanatory diagram schematically showing an operation example in the absence of fault in the relay system using the L2 switching device of FIG. 14.

FIGS. 15A and 15B are explanatory diagrams schematically showing operation examples in the absence of fault in the relay system using the L2 switching device of FIG. 14. In the relay system of FIGS. 15A and 15B, the configuration example of FIG. 14 is applied to the MCLAG devices of the configuration of FIG. 2. Also, the L2 switching device SWm2 constituting the MCLAG device maintains the reception permitted mode (second mode) and controls the MCLAG port groups P[1] and P[2], which are set to standby SBY, to the transmission prohibited state TBK.

In this configuration, the case in which a frame is transmitted and received between the terminal connected to the port P3 of the user L2 switching device SW1 and the terminal connected to the port P3 of the user L2 switching device SW2 like the case of FIG. 2 is assumed. Note that, since operations such as the learning and the retrieval on the address table FDB are the same as those in the example of FIG. 2, the descriptions will be focused on a frame path.

First, the case in which the user L2 switching device SW2 relays a frame FL5a received at the port P3 to the port P1 and the case in which the user L2 switching device SW1 relays a frame FL5b received at the port P3 to the LAG port P1 in reverse are assumed. In these cases, the frames FL5a and FL5b are transferred through the same paths as those of the frames FL1a and FL1b shown in FIG. 2, respectively.

Meanwhile, the case in which the user L2 switching device SW2 relays a frame FL5c received at the port P3 to the LAG port P2 as shown in FIG. 15B is assumed. Specifically, in the third embodiment, since the MCLAG port group P[2] of the L2 switching device SWm2 is controlled to the reception permitted mode, the L2 switching device SW2 can select the LAG port P2 as a destination port based on the predetermined distribution rule.

The L2 switching device SWm2 relays the frame FL5c containing the MCLAG identifier {MCLAG1} as a destination port and received at the MCLAG port group P[2] to the bridge port Pb based on the transmission prohibited state TBK of the MCLAG port group P[1]. The L2 switching device SWm1 relays the frame FL5c containing the MCLAG identifier {MCLAG1} as the destination port and received at the bridge port Pb to the MCLAG port group P[1] based on the transmission/reception permitted state FW of the MCLAG port group P[1]. The user L2 switching device SW1 relays the frame FL5c received at the LAG port P1 to the port P3.

Then, the case in which the user L2 switching device SW1 relays a frame FL5d received at the port P3 to the LAG port P2 in reverse is assumed. Also in this case, the L2 switching device SWm2 relays the frame FL5d containing the MCLAG identifier {MCLAG2} as a destination port and received at the MCLAG port group P[1] to the bridge port Pb based on the transmission prohibited state TBK of the MCLAG port group P[2]. The L2 switching device SWm1 relays the frame FL5d containing the MCLAG identifier {MCLAG2} as the destination port and received at the bridge port Pb to the MCLAG port group P[2] based on the transmission/reception permitted state FW of the MCLAG port group P[2]. The user L2 switching device SW2 relays the frame FL5d received at the LAG port P1 to the port P3.

In the case of using the method of the third embodiment, as can be seen from FIGS. 15A and 15B, when a frame is monitored by, for example, port mirroring, it is only required to monitor the MCLAG port groups set to active ACT (P[1] and P[2] of SWm1) like the case of FIG. 2. Therefore, also in the third embodiment, network management can be facilitated like the case of the first embodiment.

However, for example, when it is desired to monitor the frames received by the MCLAG devices in addition to the frames transmitted from the MCLAG devices, the monitoring is more facilitated by using the method of the first embodiment. The method of the third embodiment is advantageous when applied to the case in which the user L2 switching devices not having the Ethernet OAM function are used. More specifically, even such a case can be easily handled by the setting on the operation mode maintaining unit 35, and the disadvantage resulting from the link-down state caused by the transmission stop instructing unit 17 described in the first embodiment can be avoided.

In the foregoing, the invention made by the inventors of the present invention has been concretely described based on the embodiments. However, it is needless to say that the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

What is claimed is:

1. A relay system comprising:
a first switching device and a second switching device each having a first port group made up of one or a plurality of first ports, a second port and a bridge port, the first switching device and the second switching device being connected to each other by a communication line via the bridge ports; and
a third switching device connected to the one or the plurality of first ports of the first switching device and the one or the plurality of first ports of the second switching device via different communication lines, the third switching device setting a link aggregation group on ports serving as connection sources of the communication lines,
wherein each of the first switching device and the second switching device includes:
a MCLAG table which retains the one or the plurality of first ports in association with a first identifier;
a port control unit which controls the first port group to a first state in which transmission and reception are both permitted when no fault is present and the first port group is set to active and controls the first port group to a second state in which transmission and reception are both prohibited when no fault is present and the first port group is set to standby;
a relay processing unit which relays a frame containing the first identifier as a destination port to the first port group when the first port group is controlled to the first state and relays a frame containing the first identifier as a destination port to the bridge port when the first port group is controlled to the second state; and
a transmission stop instructing unit which instructs the third switching device to stop frame transmission to the first port group when the first port group is controlled to the second state, and
the first port group of the first switching device is set to the active and the first port group of the second switching device is set to the standby.

2. The relay system according to claim 1,
wherein the transmission stop instructing unit transmits a RDI frame based on Ethernet OAM from the first port group controlled to the second state.

3. The relay system according to claim 2,
wherein, when the first port group is controlled to the second state and is made up of n (n is an integer of 2 or more) first ports, the transmission stop instructing unit transmits a RDI frame based on Ethernet OAM from each of the n first ports.

4. The relay system according to claim 1,
wherein each of the first switching device and the second switching device includes a second port group made up of one or a plurality of the second ports,
the relay system further comprises a fourth switching device connected to the one or the plurality of second ports of the first switching device and the one or the plurality of second ports of the second switching device via different communication lines, the fourth switching device setting a link aggregation on ports serving as connection sources of the communication lines,
the MCLAG table retains the one or the plurality of second ports in association with a second identifier, and
the second port group of the first switching device is set to the active and the second port group of the second switching device is set to the standby.

5. The relay system according to claim 1,
wherein each of the first switching device and the second switching device further includes an operation mode maintaining unit which maintains a first mode or a second mode,
when the first mode is maintained, the port control unit controls the first port group, which is set to the standby, to the second state, and when the second mode is maintained, the port control unit controls the first port group, which is set to the standby, to a third state in which reception is permitted but transmission is prohibited, and
when the first port group is controlled to the third state, the relay processing unit relays a frame containing the first identifier as a destination port to the bridge port.

6. The relay system according to claim 1,
wherein each of the first switching device and the second switching device further includes:
a fault monitoring unit which detects a fault occurrence at the first port group, the second port, and the bridge port of its own switching device; and
a fault notifying unit which transmits a fault notification frame via the bridge port when the fault monitoring unit detects a fault occurrence at the first port group, and
when the fault monitoring unit detects a fault occurrence at the first port group, the port control unit controls the first port group to the second state, and when the fault monitoring unit detects no fault occurrence at the first port group and the fault notification frame is received via the bridge port, the port control unit controls the first port group to the first state.

7. The relay system according to claim 6,
wherein, when the fault monitoring unit detects a fault occurrence at the bridge port, the port control unit controls the first port group to the first state.

8. A switching device having a first port group made up of one or a plurality of first ports, a second port and a bridge port and connected to a different switching device via the bridge port, the switching device comprising:
a MCLAG table which retains the one or the plurality of first ports in association with a first identifier;
a port control unit which controls the first port group to a first state in which transmission and reception are both permitted when no fault is present and the first port group is set to active and controls the first port group to a second state in which transmission and reception are both prohibited when no fault is present and the first port group is set to standby;
a relay processing unit which relays a frame containing the first identifier as a destination port to the first port group when the first port group is controlled to the first state and relays a frame containing the first identifier as a destination port to the bridge port when the first port group is controlled to the second state; and
a transmission stop instructing unit which instructs a peer device connected to the first port group to stop frame transmission to the first port group when the first port group is controlled to the second state,
wherein one of the first port group and a first port group of the different switching device is set to the active, and the other thereof is set to the standby.

9. The switching device according to claim 8,
wherein the transmission stop instructing unit transmits a RDI frame based on Ethernet OAM from the first port group controlled to the second state.

10. The switching device according to claim 9,
wherein, when the first port group is controlled to the second state and is made up of n (n is an integer of 2 or more) first ports, the transmission stop instructing unit transmits a RDI frame based on Ethernet OAM from each of the n first ports.

11. The switching device according to claim 8, further comprising a second port group made up of one or a plurality of the second ports,
wherein the MCLAG table retains the one or the plurality of second ports in association with a second identifier, and
the second port group is set to the active when the first port group is set to the active, and the second port group is set to the standby when the first port group is set to the standby.

12. The switching device according to claim 8, further comprising an operation mode maintaining unit which maintains a first mode or a second mode,
wherein, when the first mode is maintained, the port control unit controls the first port group, which is set to the standby, to the second state, and when the second mode is maintained, the port control unit controls the first port group, which is set to the standby, to a third state in which reception is permitted but transmission is prohibited, and
when the first port group is controlled to the third state, the relay processing unit relays a frame containing the first identifier as a destination port to the bridge port.

13. The switching device according to claim 8, further comprising:
a fault monitoring unit which detects a fault occurrence at the first port group, the second port, and the bridge port; and
a fault notifying unit which transmits a fault notification frame via the bridge port when the fault monitoring unit detects a fault occurrence at the first port group,
wherein, when the fault monitoring unit detects a fault occurrence at the first port group, the port control unit controls the first port group to the second state, and when the fault monitoring unit detects no fault occurrence at the first port group and the fault notification frame is received via the bridge port, the port control unit controls the first port group to the first state.

14. The switching device according to claim 13,
wherein, when the fault monitoring unit detects a fault occurrence at the bridge port, the port control unit controls the first port group to the first state.

* * * * *